(12) United States Patent
Maeda et al.

(10) Patent No.: US 9,374,695 B2
(45) Date of Patent: Jun. 21, 2016

(54) MOBILE COMMUNICATIONS SYSTEM, BASE STATION, AND MOBILE TERMINAL FOR DISTRIBUTING EMERGENCY MESSAGES

(75) Inventors: Miho Maeda, Tokyo (JP); Keiko Tada, Tokyo (JP); Yoshinori Takahashi, Tokyo (JP); Hideyuki Nakamizo, Tokyo (JP); Kazunori Takahashi, Tokyo (JP); Tatsuya Itoh, Tokyo (JP); Mitsuru Mochizuki, Tokyo (JP)

(73) Assignee: TCL COMMUNICATION TECHNOLOGY HOLDINGS LIMITED, Kowloon (HK)

( * ) Notice: Subject to any disclaimer, the term of this patent is extended or adjusted under 35 U.S.C. 154(b) by 741 days.

(21) Appl. No.: 12/602,781

(22) PCT Filed: Jul. 4, 2008

(86) PCT No.: PCT/JP2008/001789
§ 371 (c)(1),
(2), (4) Date: Dec. 3, 2009

(87) PCT Pub. No.: WO2009/004824
PCT Pub. Date: Jan. 8, 2009

(65) Prior Publication Data
US 2010/0178895 A1    Jul. 15, 2010

(30) Foreign Application Priority Data
Jul. 5, 2007   (JP) ................................. 2007-177529

(51) Int. Cl.
| *H04W 68/00* | (2009.01) |
| *H04W 68/06* | (2009.01) |
| *H04W 68/10* | (2009.01) |
| *H04W 4/22*  | (2009.01) |
| *H04W 76/00* | (2009.01) |
| *H04W 4/06*  | (2009.01) |

(52) U.S. Cl.
CPC .............. *H04W 4/22* (2013.01); *H04W 76/007* (2013.01); *H04W 4/06* (2013.01)

(58) Field of Classification Search
CPC ......... H04W 4/06; H04W 4/22; H04W 68/00; H04W 68/06; H04W 68/10
USPC ...................................................... 455/404.1
See application file for complete search history.

(56) References Cited

U.S. PATENT DOCUMENTS

| 6,201,974 B1 | 3/2001 | Lietsalmi et al. |
| 2002/0019241 A1* | 2/2002 | Vialen .................... H04W 68/00 455/458 |

(Continued)

FOREIGN PATENT DOCUMENTS

| CN | 1235740 A | 11/1999 |
| EP | 2 037 596 A1 | 3/2009 |

(Continued)

OTHER PUBLICATIONS

U.S. Appl. No. 13/264,767, filed Oct. 17, 2011, Mochizuki, et al.

(Continued)

*Primary Examiner* — Olumide T Ajibade Akonai
*Assistant Examiner* — Ki Ha Nam
(74) *Attorney, Agent, or Firm* — Shimokaji IP

(57) ABSTRACT

A mobile communications system including a mobile terminal 1 and a base station 2 which relays communications between a network and the mobile terminal 1, in which the base station 2 can deliver information to the mobile terminal 1 by using an MBMS, in which the base station 2 sets a flag indicating presence or absence of emergency information to a control channel used for the MBMS, and notifies the presence or absence of the emergency information to the mobile terminal 1 by using the description of the flag set to the control channel for the MBMS.

5 Claims, 16 Drawing Sheets

(56) References Cited

U.S. PATENT DOCUMENTS

| | | | |
|---|---|---|---|
| 2004/0203562 A1 | 10/2004 | Kolsrud | |
| 2005/0037728 A1* | 2/2005 | Binzel | H04L 12/1895 455/404.1 |
| 2005/0049013 A1* | 3/2005 | Chang et al. | 455/574 |
| 2006/0040639 A1* | 2/2006 | Karl et al. | 455/404.1 |
| 2006/0058005 A1 | 3/2006 | Dolezal et al. | |
| 2006/0176838 A1 | 8/2006 | Lee et al. | |
| 2006/0178128 A1* | 8/2006 | Eaton et al. | 455/404.1 |
| 2007/0270118 A1* | 11/2007 | Subramanian et al. | 455/343.2 |
| 2008/0194224 A1* | 8/2008 | Thorson et al. | 455/404.1 |
| 2008/0207245 A1 | 8/2008 | Wakabayashi et al. | |
| 2008/0227428 A1* | 9/2008 | Rezaiifar et al. | 455/404.1 |
| 2009/0180414 A1 | 7/2009 | Maeda et al. | |
| 2010/0183031 A1* | 7/2010 | Dalsgaard | H04W 28/06 370/474 |

FOREIGN PATENT DOCUMENTS

| | | |
|---|---|---|
| JP | 7 58689 | 3/1995 |
| JP | 10 42365 | 2/1998 |
| JP | 3529351 | 5/2004 |
| JP | 2007 81574 | 3/2007 |
| JP | 2007 281957 | 10/2007 |
| WO | WO 2006/066629 A1 | 6/2006 |
| WO | 2006104343 | 10/2006 |

OTHER PUBLICATIONS

U.S. Appl. No. 13/378,380, filed Dec. 15, 2011, Maeda, et al.
U.S. Appl. No. 13/420,306, filed Mar. 14, 2012, Maeda, et al.
U.S. Appl. No. 13/499,026, filed Mar. 29, 2012, Maeda, et al.
U.S. Appl. No. 13/504,672, filed Apr. 27, 2012, Maeda, et al.
U.S. Appl. No. 13/499,737, filed Apr. 2, 2012, Mochizuki, et al.
U.S. Appl. No. 13/127,632, filed May 4, 2011, Maeda, et al.
U.S. Appl. No. 13/141,858, filed Jun. 23, 2011, Maeda, et al.
U.S. Appl. No. 13/144,972, filed Jul. 18, 2011, Maeda, et al.
"3rd Generation Partnership Project; Technical Specification Group Terminals; Technical realization of Cell Broadcast Service (CBS) Release 1999", 3GPP TS 23.041 V3.5.0, pp. 1-37, (Jun. 2002).
"3rd Generation Partnership Project; Technical Specification Group Radio Access Network; Introduction of the Multimedia Broadcast Multicast Service (MBMS) in the Radio Access Network (RAN); Stage 2 Release 7", 3GPP TS 25.346 V7.3.0, pp. 1-60, (Mar. 2007).
Tachikawa, Keiji et al., "W-CDMA mobile communications system", pp. 162-163 and 168-171, Jun. 25, 2001, (with partial English translation).
"3rd Generation Partnership Project; Technical Specification Group Radio Access Network; Radio Resource Control (RRC); Protocol Specification (Release 6), 8.7 (MBMS specific procedures)", 3GPP TS 25.331 V6.6.0, pp. 356-367, (Jun. 2005).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0, pp. 1-109, (Sep. 2007).
Chinese Office Action Issued May 30, 2012 in Patent Application No. 200880023271.1 (with English translation).
U.S. Appl. No. 14/298,168, filed Jun. 6, 2014, Mochizuki, et al.
U.S. Appl. No. 14/531,516, filed Nov. 3, 2014, Maeda, et al.
U.S. Appl. No. 14/534,958, filed Nov. 6, 2014, Mochizuki, et al.

* cited by examiner

FIG. 15
(A)
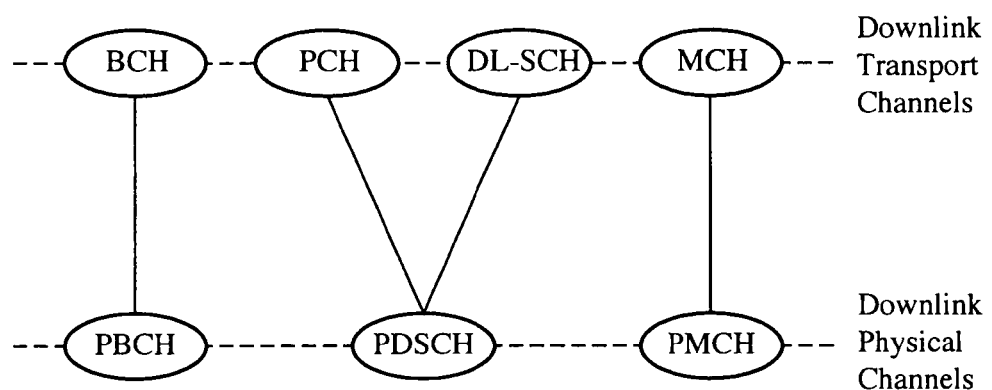
(B)
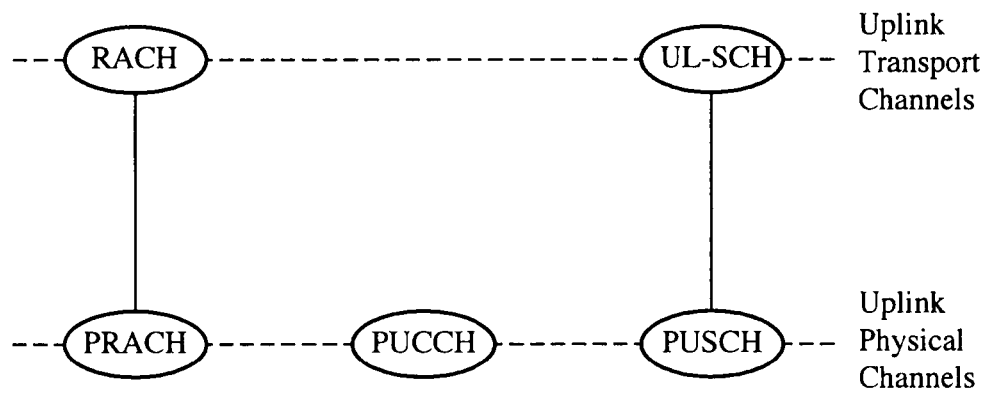

MOBILE COMMUNICATIONS SYSTEM, BASE STATION, AND MOBILE TERMINAL FOR DISTRIBUTING EMERGENCY MESSAGES

FIELD OF THE INVENTION

The present invention relates to a mobile communications system that can notify emergency information by using a broadcast type multimedia service, and a base station and a mobile terminal which construct this mobile communications system.

BACKGROUND OF THE INVENTION

Recent years have seen growing social needs for a system which, in the event of occurrence of an emergency situation, such as an earthquake or a tsunami, can notify emergency information about the emergency to many people immediately. On the other hand, the market size of mobile terminals, such as mobile phones, is increasing year by year. In Japan, the market size has reached more than 90 million sets of mobile terminals and there occur social circumstances in which many persons own a mobile phone. Therefore, information delivery using mobile terminals via a mobile communications network can be made to serve as an effective notifying means of notifying emergency information.

As a system for notifying emergency information, for example, J-ALERT (a nationwide instantaneous alert system) has been examined. This nationwide instantaneous alert system is assumed to use a municipal disaster prevention radio to notify emergency information by way of speakers for disaster broadcasting which are mainly installed indoors and outdoors. However, this nationwide instantaneous alert system using speakers to notify, by voice, emergency information causes a case in which those who live in an area distant from the speakers and so on cannot know the emergency information.

To solve this problem, there has been proposed a system that notifies, by voice or by using an e-mail, emergency information to mobile terminals, which users who are registered to receive a service manage respectively, via an existing mobile communications network. Furthermore, there has been also considered a method of broadcasting emergency information to an indefinite number of users by using digital terrestrial broadcasting.

As a service for broadcasting information to an indefinite number of users in a mobile communications system, there has been provided, for example, a CBS (Cell Broadcast Short message service) (refer to nonpatent reference 1). This CBS is a point-to-multipoint (Point to Multipoint) service which enables abase station which provides a service in a mobile communications system to carry out broadcast communications with mobile terminals which are registered into the base station and have come under the control of the base station. It is defined according to the 3GPP (3 rd Generation Partnership Project) that each mobile terminal can be placed in either one of the following states: an Idle state, a CELL_DCH state, a CELL_FACH state, a CELL_PCH state, and a URA_PCH state (refer to nonpatent reference 2). In the mobile communications system, each mobile terminal operates while making a transition among these states whenever necessary.

Furthermore, as a conventional emergency information notifying system using a mobile communications network, for example, patent reference 1 discloses an emergency information notifying system. This emergency information notifying system uses broadcast information which a base station transmits to all the mobile terminals being under the control thereof for notification of emergency information. The emergency information notifying system adds, as parameters, channel information used for reception of the emergency information and an identifier of the emergency information to this broadcast information, so that all the mobile terminals can receive a channel via which the emergency information is transmitted thereto on the basis of these parameters.

On the other hand, as a service suitable for transmitting emergency information to an indefinite number of user terminals in a mobile communications system, a broadcast type multimedia service which enables simultaneous delivery of one transmission data to a plurality of users' mobile terminals has been studied. In this broadcast type multimedia service, especially, multimedia information about sports live broadcasting, a weather forecast, a radio, or the like is delivered simultaneously to a plurality of users' mobile terminals as a service of the mobile communications system. In the 3GPP, this technology is called an MBMS (Multimedia Broadcast Multicast Service) (refer to nonpatent reference 3).

In the MBMS, it is assumed that a multimedia service as mentioned above is provided, and a fast transfer of a moving image or the like is supported. Therefore, as compared with the CBS, a larger amount of information can be transmitted at a higher rate, and the MBMS is suitable for a system for broadcasting emergency information according to the needs of an indefinite number of users.

As channels in a wireless section used for the MBMS, as shown in nonpatent reference 3, three logical channels (an MCCH, an MTCH, and an MSCH) are introduced, and an MICH (MBMS Indicator CHannel) is introduced as an indicator similar to a PICH. The MCCH (MBMS Control CHannel) is a channel on which control information about the MBMS is carried, and the MTCH (MBMS Traffic CHannel) is a channel on which data about the MBMS are carried. The MICH has the same physical structure as the PICH based on the R99 (release 99) standard in the 3GPP, and, when information is carried on the MCCH, this bit is set in advance.

A mobile terminal receives data about the MBMS which are carried on the MTCH according to the MBMS control channel (MCCH). When certain information is carried on the MCCH, the bit of the MICH which is an indicator for MBMS notification is set, and, after recognizing the bit, the mobile terminal receives the MCCH on which new control information is carried. In this case, the mobile terminal receives the MTCH on which data about the MBMS are carried according to the newly received MCCH.

Furthermore, the procedure for receiving the MCCH does not depend on the state in which the mobile terminal can enter (the Idle state, and the RRC connected state (RRC_Connected) (the CELL_DCH state, the CELL_FACH state, the CELL_PCH state, or the URA_PCH state)), and can be applied to all mobile terminals which support the MBMS (refer to nonpatent reference 4). Therefore, even if a mobile terminal is placed in any of the above-mentioned states, the mobile terminal can receive data about the MBMS.

According to the 3GPP, as a communications method different from W-CDMA, a new communications method which is called "long term evolution" (Long Term Evolution LTE) for a wireless section and which is also called "system architecture evolution" (System Architecture Evolution SAE) for a whole system structure including a core network has been examined. In an access method for LTE, OFDM (Orthogonal Frequency Division Multiplexing) is used for a downlink direction, while SC-FDMA (Single Career Frequency Division Multiple Access) is used for an uplink direction. The bandwidth in the case of W-CDMA is 5 MHz, while the bandwidth in the case of LTE can be selected from among 1.4 MHz, 3 MHz, 5 MHz, 10 MHz, 15 MHz, and 20 MHz for each and every base station. Furthermore, in the case of LTE, no circuit switching is included, unlike in the case of W-CDMA, only a packet communications method is included.

In an LTE communications system, a base station (Base station) that communicates with a mobile terminal (UE: User Equipment) is called an eNB (E-UTRANNodeB), and a base station control apparatus (Radio Network Controller) which performs exchange of control data and user data with a plurality of base stations is called an EPC (Evolved Packet Core) (also called an aGW: Access Gateway). In this LTE communications system, a unicast (Unicast) service and an E-MBMS service (Evolved Multimedia Broadcast Multicast Service) are provided. The E-MBMS service is a broadcast type multimedia service, and may be simply called an MBMS. A large-amount broadcast content, such as a news content, a weather forecast content, or a mobile broadcasting content, is transmitted to a plurality of mobile terminals. This is also called a point-to-multipoint (Point to Multipoint) service.

The current determined matters of the whole architecture (Architecture) of LTE systems in the 3GPP are described in nonpatent reference 5. The whole architecture will be explained with reference to FIG. 11 (refer to Chapter 4 of nonpatent reference 5). FIG. 11 is an explanatory drawing showing the structure of a communications system according to an LTE method. In FIG. 11, if a control protocol (e.g. RRC (Radio Resource Management)) and a user plane (e.g. PDCP: Packet Data Convergence Protocol, RLC: Radio Link Control, MAC: Medium Access Control, PHY: Physical layer) for a mobile terminal 101 are terminated at a base station 102, an E-UTRAN (Evolved Universal Terrestrial Radio Access) is constructed of one or more base stations 102. Each base station 102 carries out scheduling (Scheduling) and transmission of a paging signal (Paging Signaling, which is also called a paging message (paging message)) which is notified from an MME (Mobility Management Entity) 103. The base stations 102 are connected to one another via an X2 interface. Furthermore, each base station 102 is connected to an EPC (Evolved Packet Core) via an S1 interface. More specifically, each base station 102 is connected to an MME (Mobility Management Entity) 103 via an S1_MME interface, and is connected to an S-GW (Serving Gateway) 104 via an S1_U interface. Each MME 103 distributes a paging signal to a plurality of base stations 102 or a single base station 102. Furthermore, each MME 103 performs mobility control (Mobility control) in an idle state (Idle State). Each S-GW 104 performs transmission and reception of user data to and from one or more base stations 102.

The current determined matters about the frame structure of LTE systems in the 3GPP are described in nonpatent reference 5 (Chapter 5). They will be explained with reference to FIG. 12. FIG. 12 is an explanatory drawing showing the structure of a radio frame for use in a communications system using an LTE method. In FIG. 12, one radio frame (Radio frame) has a length of 10 ms. The radio frame is divided into ten equal-sized sub-frames (Sub-frames). Each of the sub-frames is divided into two equal-sized slots (slots). A downlink synchronous channel (Downlink Synchronization Channel: SCH) is included in each of the first (#0) and sixth (#5) sub-frames of every frame. Synchronizing signals include a primary synchronization channel (Primary Synchronization Channel: P-SCH) and a secondary synchronization channel (Secondary Synchronization Channel: S-SCH). Multiplexing of channels for MBSFN (Multimedia Broadcast multicast service Single Frequency Network) and channels other than the channels for MBSFN is performed on a sub-frame basis.

Hereafter, sub-frames for MBSFN transmission are called MBSFN sub-frames (MBSFN sub-frames). In nonpatent reference 5, an example of signaling at the time of assignment of MBSFN sub-frames is described. FIG. 13 is an explanatory drawing showing the structure of MBSFN frames. As shown in FIG. 13, MBSFN sub-frames are assigned to every MBSFN frame (MBSFN frame). MBSFN frame clusters (MBSFN frame Clusters) are scheduled. The repetition period (Repetition Period) of the MBSFN frame clusters is assigned.

The current determined matters about the channel configuration of LTE systems in the 3GPP are described in nonpatent reference 5. Physical channels (Physical channels) will be explained with reference to FIG. 14 (refer to Chapter 5 of nonpatent reference 5). FIG. 14 is an explanatory drawing explaining physical channels for use in a communications system according to an LTE method. In FIG. 14, a physical broadcast channel 401 (Physical Broadcast channel: PBCH) is a downlink channel which is transmitted from a base station 102 to a mobile terminal 101. BCH transport blocks (transport blocks) are mapped to four sub-frames during an interval of 40 ms. There is no clear signaling at a timing of 40 ms. A physical control channel format indicator channel 402 (Physical Control format indicator channel: PCFICH) is transmitted from the base station 102 to the mobile terminal 101. The PCFICH is used to notify the number of OFDM symbols which are used for PDCCHs from the base station 102 to the mobile terminal 101. The PCFICH is transmitted for every sub-frame. A physical downlink control channel 403 (Physical downlink control channel: PDCCH) is a downlink channel which is transmitted from the base station 102 to the mobile terminal 101. The PDCCH is used to notify resource allocation (allocation), HARQ information about a DL-SCH (a downlink shared channel which is one of transport channels shown in FIG. 15), and a PCH (a paging channel which is one of the transport channels shown in FIG. 15). The PDCCH carries an uplink scheduling grant (Uplink Scheduling Grant). The PDCCH carries ACK/Nack which is a response signal to uplink transmission. A physical downlink shared channel 404 (Physical downlink shared channel: PDSCH) is a downlink channel which is transmitted from the base station 102 to the mobile terminal 101. A DL-SCH (a downlink shared channel) which is a transport channel is mapped to the PDSCH. A physical multicast channel 405 (Physical multicast channel: PMCH) is a downlink channel which is transmitted from the base station 102 to the mobile terminal 101. An MCH (multicast channel) which is a transport channel is mapped to the PMCH.

A physical uplink control channel 406 (Physical Uplink control channel: PUCCH) is an uplink channel which is transmitted from the mobile terminal 101 to the base station 102. The PUCCH carries ACK/Nack which is a response signal (response) to downlink transmission. The PUCCH carries a CQI (Channel Quality indicator) report. CQI is quality information showing either the quality of received data or channel quality. A physical uplink shared channel 407 (Physical Uplink shared channel: PUSCH) is an uplink channel which is transmitted to the base station 102 from the mobile terminal 101. A UL-SCH (uplink shared channel which is one of the transport channels shown in FIG. 15) is mapped to the PUSCH. A physical HARQ indicator channel 408 (Physical Hybrid ARQ indicator channel: PHICH) is a downlink channel which is transmitted from the base station 102 to the mobile terminal 101. The PHICH carries ACK/Nack which is a response to uplink transmission. A physical random access channel 409 (Physical random access channel: PRACH) is an uplink channel which is transmitted from the mobile terminal 101 to the base station 102. The PRACH carries a random access preamble (random access preamble).

The transport channels (Transport channels) will be explained with reference to FIG. 15 (refer to Chapter 5 of nonpatent reference 5). FIG. 15 is an explanatory drawing explaining the transport channels for use in a communications system according to an LTE method. Mapping between the downlink transport channels and the downlink physical channels is shown in FIG. 15A. Mapping between the uplink transport channels and the uplink physical channels is shown in FIG. 15B. As to the downlink transport channels, a broadcast channel (Broadcast channel: BCH) is broadcast to all the base stations (cell). The BCH is mapped to the physical broadcast channel (PBCH). Retransmission control with HARQ (Hybrid ARQ) is applied to the downlink shared channel (Downlink Shared channel: DL-SCH). A broadcast to all the base stations (cell) can be carried out. Dynamic or semi-static (Semi-static) resource allocation is supported. Semi-static resource allocation is also referred to as persistent scheduling (Persistent Scheduling). In order to decrease the power consumption of a mobile terminal, DRX (Discontinuous reception) of the mobile terminal is supported. The DL-SCH is mapped to the physical downlink shared channel (PDSCH). The paging channel (Paging channel: PCH) supports the DRX of the mobile terminal in order to enable decrease in the power consumption of the mobile terminal. A request for a broadcast to all the base stations (cell) is made. It is mapped to either a physical resource like the physical downlink shared channel (PDSCH) which can be dynamically used for traffic, or a physical resource like the physical downlink control channel (PDCCH) which is another control channel. The multicast channel (Multicast channel: MCH) is used for a broadcast to all the base stations (cell). SFN combining of MBMS services (the MTCH and the MCCH) in multi-cell transmission is supported. Semi-static resource allocation is supported. The MCH is mapped to the PMCH.

Retransmission control with HARQ (Hybrid ARQ) is applied to the uplink shared channel (Uplink Shared channel: UL-SCH). Dynamic or semi-static (Semi-static) resource allocation is supported. The UL-SCH is mapped to the physical uplink shared channel (PUSCH). A random access channel (Random access channel: RACH) shown in FIG. 15B is limited to control information. There is a risk of collision. The RACH is mapped to the physical random access channel (PRACH).

The logical channels (Logical channels) will be explained with reference to FIG. 16 (refer to Chapter 6 of nonpatent reference 5). FIG. 16 is an explanatory drawing explaining the logical channels for use in a communications system according to an LTE method. Mapping between the downlink logical channels and the downlink transport channels is shown in FIG. 16A. Mapping between the uplink logical channels and the uplink transport channels is shown in FIG. 16B. A broadcast control channel (Broadcast control channel: BCCH) is a downlink channel for broadcast system control information. The BCCH which is a logical channel is mapped to either the broadcast channel (BCH) which is a transport channel or the downlink shared channel (DL-SCH). A paging control channel (Paging control channel: PCCH) is a downlink channel for transmitting a paging signal. The PCCH is used when the network does not know the cell location of a mobile terminal. The PCCH which is a logical channel is mapped to the paging channel (PCH) which is a transport channel. A common control channel (Common control channel: CCCH) is a channel for transmission of control information between a mobile terminal and a base station. The CCCH is used when the mobile terminal does not have any RRC connection (connection) with the network. Whether to dispose the CCCH in the downlink is not decided at the current time. In the uplink direction, the CCCH is mapped to the uplink shared channel (UL-SCH) which is a transport channel.

The multicast control channel (Multicast control channel: MCCH) is a downlink channel for point-to-multipoint transmission. This channel is used for transmission of one or more pieces of MEMS control information for MTCH from the network to a mobile terminal. The MCCH is used only for a mobile terminal which is receiving an MBMS. The MCCH is mapped to either the downlink shared channel (DL-SCH) which is a transport channel or the multicast channel (MCH). A dedicated control channel (Dedicated control channel: DCCH) is a channel used for transmission of individual control information between a mobile terminal and the network. The DCCH is mapped to the uplink shared channel (UL-SCH) in the uplink, while the DCCH is mapped to the downlink shared channel (DL-SCH) in the downlink. A dedicated traffic channel (Dedicate Traffic channel: DTCH) is a channel used for point to point communications with an individual mobile terminal for transmission of user information. The DTCH exists for both the uplink and the downlink. The DTCH is mapped to the uplink shared channel (UL-SCH) in the uplink, while the DTCH is mapped to the downlink shared channel (DL-SCH) in the downlink. The multicast traffic channel (Multicast Traffic channel: MTCH) is a downlink channel used for transmission of traffic data from the network to a mobile terminal. The MTCH is used only for a mobile terminal which is receiving an MBMS. The MTCH is mapped to either the downlink shared channel (DL-SCH) or the multicast channel (MCH).

The current determined matters about an E-MBMS service in the 3GPP are described in nonpatent reference 5. The definition of terms about E-MBMS will be explained with reference to FIG. 17 (refer to Chapter 15 of nonpatent reference 5). FIG. 17 is an explanatory drawing explaining a relation between an MBSFN synchronization area and an MBSFN area. In FIG. 17, the MBSFN synchronization area 701 (Multimedia Broadcast multicast service Single Frequency Network Synchronization Area) is an area of the network in which all the base stations can be synchronized with one another and can carry out MBSFN (Multimedia Broadcast Multicast service Single Frequency Network) transmission. The MBSFN synchronization area includes one or more MBSFN areas (MBSFN Areas) 702. In one frequency layer (frequency layer), each base station has no alternative but to belong to only one MBSFN synchronization area. Each MBSFN area 702 (MBSFN Area) consists of a group of base stations (cell) included in the MBSFN synchronization area of the network. Base stations (cell) included in the MBSFN synchronization area may construct a plurality of MBSFN areas.

The logical architecture (Logical Architecture) of the E-MBMS will be explained with reference to FIG. 18 (refer to Chapter 15 of nonpatent reference 5). FIG. 18 is an explanatory drawing explaining the logical architecture (Logical Architecture) of the E-MBMS. In FIG. 18, a multi-cell/multicast coordination entity 801 (Multi-cell/multicast Coordination Entity: MCE) is a logical entity. The MCE 801 allocates radio resources to all the base stations in the MBSFN area in order to carry out multi-cell MBMS transmission (multi-cell MBMS transmission). The MCE 801 makes a decision about the details of the radio structure (e.g. a modulation method and codes) in addition to allocation of time or/and frequency radio resources. An E-MEMS gateway 802 (MBMS GW) is a logical entity. The E-MBMS gateway 802 is located between an eBMSC and base stations, and has a main function of transmitting/broadcasting an MEMS service to each of the base stations according to the SYNC protocol. An M3 interface is a control interface (Control Plane Interface) between the MCE 801 and the E-MBMS gateway 802. An M2 interface is a control interface between the MCE 801 and an eNB 102. An M1 interface is a user data interface (User Plane Interface) between the E-MBMS gateway 802 and the eNB 102.

The architecture (Architecture) of the E-MBMS will be explained (refer to Chapter 15 of nonpatent reference 5). FIG. 19 is an explanatory drawing explaining the architecture (Architecture) of the E-MBMS. As shown in FIGS. 19A and 19B, there can be considered two cases of the architecture of the E-MBMS. A cell for the MBMS will be explained (refer to Chapter 15 of nonpatent reference 5). In an LTE system, there are an MEMS-dedicated cell (base stations) (an MBMS-dedicated cell), and an MBMS/Unicast-mixed cell (MBMS/Unicast-mixed cell) which can perform both an MBMS and a unicast service.

MBMS transmission will be explained (refer to Chapter 15 of nonpatent reference 5). In the MBMS transmission in an LTE system, single-cell transmission (Single-cell transmission: SC transmission) and multi-cell transmission (multi-cell transmission: MC transmission) are supported. In the single-cell transmission, any SFN (Single frequency Network) operation is not supported. In contrast, in the multi-cell transmission, an SFN operation is supported. In the MBSFN (Multimedia Broadcast multicast service Single Frequency Network) area, transmission of an MBMS is synchronized. SFN combining (Combining) of MBMS services (the MTCH and the MCCH) in the multi-cell transmission is supported. The MTCH and the MCCH are mapped to the MCH in point-to-multipoint transmission. Scheduling is performed by the MCE.

The structure (Structure) of the Multicast control channel (MCCH) will be explained (refer to Chapter 15 of nonpatent reference 5). The broadcast control channel (BCCH) which is a downlink logical channel shows scheduling of one or two primary multicast control channels (Primary MCCHs: P-MCCHs). A P-MCCH for single-cell transmission is mapped to the DL-SCH (downlink shared channel). Furthermore, a P-MCCH for multi-cell transmission is mapped to the MCH (multicast channel). When a secondary multicast control channel (Secondary MCCH: S-MCCH) is mapped onto the MCH, the address of the secondary multicast control channel (S-MCCH) can be shown by using the primary multicast control channel (P-MCCH). The broadcast control channel (BCCH) shows the resource of the primary multicast control channel (P-MCCH), but does not show any available service.

The current determined matters about paging in the 3GPP are described in nonpatent reference 5 (Chapter 10). A paging group uses an L1/L2 signaling channel (PDCCH). The precise identifier (UE-ID) of a mobile terminal can be identified on the paging channel (PCH).

[Nonpatent reference 1] 3GPP technical specifications TS23.041 V3.5.0
[Nonpatent reference 2] W-CDMA mobile communications system, compiled under the supervision of Keiji Tachikawa and published on Jun. 6, 2001, pages 162-171
[Nonpatent reference 3] 3GPP technical specifications TS25.346 V7.3.0
[Nonpatent reference 4] 3GPP technical specifications TS25.331 V6.6.0
[Nonpatent reference 5] 3GPP technical specifications TS36.300 V8.2.0
[Patent reference 1] Japanese Patent Gazette No. 3529351

Because conventional mobile communications systems are constructed as mentioned above, a problem with them is that they are easily affected by the influence of the load on the communications line when they are used as a system for broadcasting emergency information to an indefinite number of users, the area in which emergency information can be delivered is narrow, and the immediacy of the information may be impaired.

To be more specific, a conventional system that notifies emergency information, via an existing mobile communications network, to users' mobile terminals by voice or by using an e-mail carries out provision of information via one-to-one communications between each of mobile terminals owned by users who are registered to receive the service and a base station which provides this service. Therefore, because the service depends upon the capacity of the communications line between the base station and the mobile terminals, there occurs a case in which the load on the communications line increases and therefore the conventional system cannot notify emergency information to the mobile terminals when the number of users to whom the conventional system notifies the emergency information increases. Therefore, the conventional system is not suitable for notification of emergency information to an indefinite number of users.

Furthermore, in a conventional system that notifies emergency information by using digital terrestrial broadcasting, as compared with a system using a mobile communications network, there are many locations where the receiving characteristics of digital terrestrial broadcasting waves degrade, such as an indoor, the shade of a building, and an underground shopping area, and there may be a case in which emergency information cannot be broadcast precisely. In addition, because it is necessary to add hardware used for receiving digital terrestrial broadcasting to each mobile terminal, the conventional system has a demerit for the downsizing and low pricing of mobile terminals.

A base station carries out point-to-multipoint communications with mobile terminals in the case of the CBS, and therefore the CBS is suitable for notification of emergency information to an indefinite number of users. However, when a base station broadcasts data to mobile terminals, all of the mobile terminals cannot receive the transmission data and only mobile terminals in an idle (Idle) state can receive the transmission data. As mentioned above, each of the mobile terminals is operating while making a transition among a plurality of states defined by the 3GPP on an as needed basis. Therefore, although each mobile terminal can receive the emergency information broadcast thereto when it is placed in the idle (Idle) state, each mobile terminal cannot receive the emergency information broadcast thereto when it is placed in a state other than the idle (Idle) state, and therefore there is a case in which the emergency information is not notified precisely to each mobile terminal.

Furthermore, the CBS is predicated on transmission of a short message at a lower rate of about 80 octets from a base station. Therefore, the short message defined for the CBS does not have a data amount enough to notify emergency information, such as map information or picture information, according to the needs of users.

In contrast with this, the system disclosed by patent reference 1 can broadcast emergency information to all the mobile terminals being registered into a base station and being under the control of the base station. However, what type of channel is used as the channel via which emergency information is transmitted is not specified in patent reference 1. Therefore, whether a dedicated channel, a broadcast channel, or a special channel is used as the channel via which emergency information is transmitted is unknown, and at what rate the emergency information can be transmitted and whether the emergency information meets the needs of users are not known at all.

In addition, in the system disclosed by patent reference 1, because channel information for receiving the emergency information and the identifier of the emergency information have to be added to broadcast information as parameters, the amount of information which should be transmitted as the broadcast information increases unavoidably. In general, many pieces of system information required for a base station to transmit broadcast information to all the mobile terminals being under the control thereof have to be included in the broadcast information. Therefore, it is also expected that the use of the method of adding the parameters for transmitting emergency information to broadcast information causes a necessity to limit the data amount of the parameters for transmitting emergency information in consideration of the amount of information to be transmitted as the broadcast information, and an excessive increase in the amount of information of the broadcast information to which the parameters are added.

In contrast, in the case of the MBMS, because each mobile terminal can receive information even if it is placed in which state defined in the 3GPP, and can receive a fast transfer of data, such as a moving image, emergency information data having an amount of information which meets the needs of users can be transmitted to each mobile terminal. Furthermore, because it is not necessary to include any additional information in broadcast information, unlike in the case of the system disclosed by patent reference 1, the malfunctions which can be expected to occur in the system disclosed by above-mentioned patent reference 1 can be eliminated.

A problem with a conventional mobile communications system which performs an MBMS is, however, that the conventional mobile communications system can deliver multimedia information to a plurality of users' mobile terminals simultaneously, while each user side cannot receive provision of any information unless it initiatively receives an MTCH on which desired data are carried, and therefore the immediacy of emergency information may be impaired.

The present invention is made in order to solve the above-mentioned problems, and it is therefore an object of the present invention to provide a mobile communications system that can notify emergency information by using a broadcast type multimedia service being able to provide the emergency information for a wide area without imposing an excessive load on a mobile communications network and without impairing the immediacy of the emergency information, and a base station and a mobile terminal which construct this mobile communications system.

Disclosure of the Invention

In accordance with the present invention, there is provided a mobile communications system including a mobile terminal and a base station which relays communications between a network and the mobile terminal, in which the base station can deliver information to the mobile terminal by using a broadcast type multimedia service, characterized in that the base station sets a flag indicating presence or absence of emergency information to a control channel used for the broadcast type multimedia service, and notifies the presence or absence of the emergency information to the mobile terminal by using a description of the flag set to the control channel.

The mobile communications system in accordance with the present invention notifies the presence or absence of emergency information to the mobile terminal with the description of the flag disposed in the control channel for the broadcast type multimedia service and showing the presence or absence of emergency information. Therefore, the mobile communications system can notify emergency information to the mobile terminal by using the broadcast type multimedia service which provides a large amount of deliverable information without imposing an excessive load on a mobile communications network and without impairing the immediacy of the emergency information.

BRIEF DESCRIPTION OF THE FIGURES

FIG. 15 is an explanatory drawing explaining transport channels for use in a communications system according to an LTE method;

PREFERRED EMBODIMENTS OF THE INVENTION

Hereafter, in order to explain this invention in greater detail, the preferred embodiments of the present invention will be described with reference to the accompanying drawings.

Embodiment 1

In accordance with this Embodiment 1, an emergency information flag (an emergency information indicator) indicating the presence or absence of emergency information is disposed in an MCCH which is an MBMS control channel, and a mobile terminal is enabled to check the presence or absence of the emergency information at regular intervals. Accordingly, even while receiving information other than the emergency information by using an MBMS, the mobile terminal can recognize the existence of the emergency information by using the emergency information flag, and can receive an emergency information channel included in the MBMS.

Figure 1:
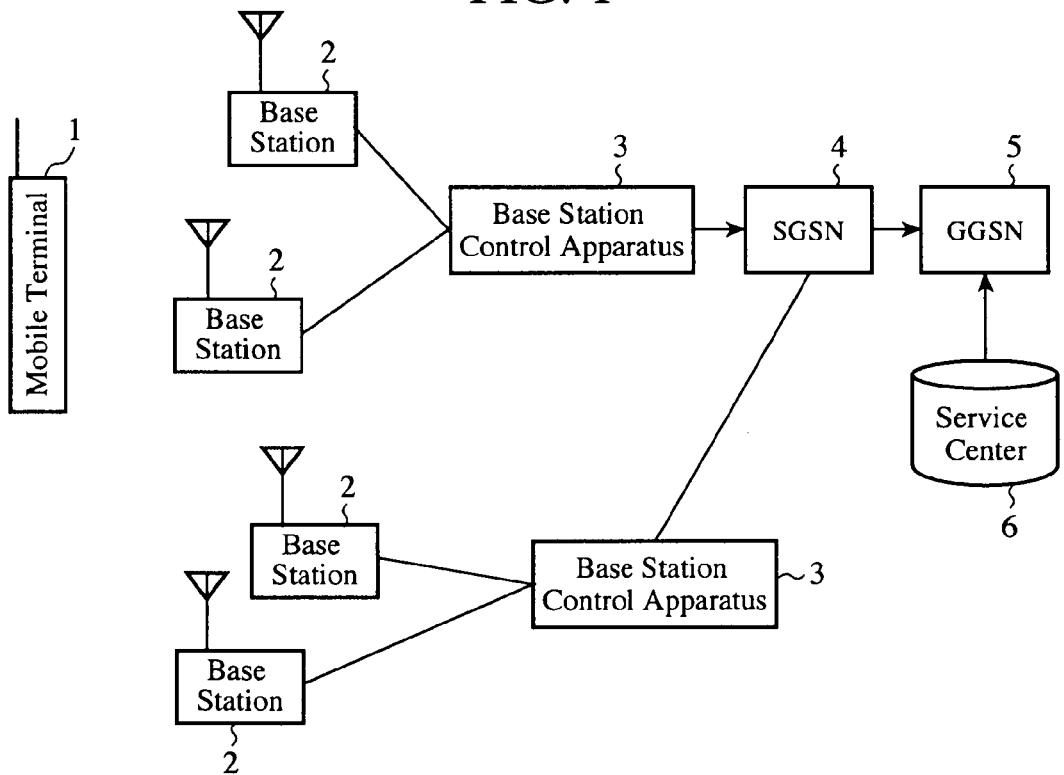
FIG. 1 is a diagram showing the structure of a mobile communications system in accordance with the present invention.

FIG. 1 is a diagram showing the structure of a mobile communications system in accordance with the present invention. In this system, emergency information is notified to all mobile terminals 1 which support the MBMS by using the MBMS. In FIG. 1, the mobile communications system in accordance with the present invention is provided with mobile terminals 1, base stations 2, base station control apparatuses 3, an SGSN 4, a GGSN 5, and a service center 6. Each mobile terminal 1 is a communications unit that receives data from one or more base stations 2. Each base station 2 transmits and receives data to and from each mobile terminal 1 existing in the cell which is covered thereby. Each base station control apparatus 3 is connected to a plurality of base stations 2 and controls communications carried out by each of the base stations 2, and is also connected to the SGSN 4 and relays communications between each of the base stations 2 and the SGSN 4.

The SGSN (Service GPRS Support Node) 4 is a node that takes charge of packet communications in the mobile communications system, and handles authentication of an individual user who has been registered into a GPRS (General Packet Radio Service), service subscription, routing, management of mobility, service restrictions, context storage, accounting information, etc.

The GGSN (GPRS Gateway Support Node) 5 is a node that has a function of operating as a gateway for an external network (e.g. the Internet), and ensures a path (path) for either packets transmitted thereto from the SGSN 4 or packets received by the SGSN 4. The GGSN 5 carries out processes including collection of accounting information, mobility management, QoS (Quality of Service) negotiation, a policy control process of adjusting traffic, in addition to the function of operating as a gateway.

The service center 6 is a communications node that connects the mobile communications system with the external network to store a content for service provision therein and to deliver a content to the mobile communications system, and transmits data associated with a content to the GGSN 5 according to a request made by a user. In a W-CDMA system, each mobile terminal 1 may be called a UE (User Equipment), each base station 2 may be called a Node-B, and each base station control apparatus 3 may be called an RNC (Radio Network Controller).

Next, channels used for packet communications, such as MEMS, will be explained.

Figure 2:
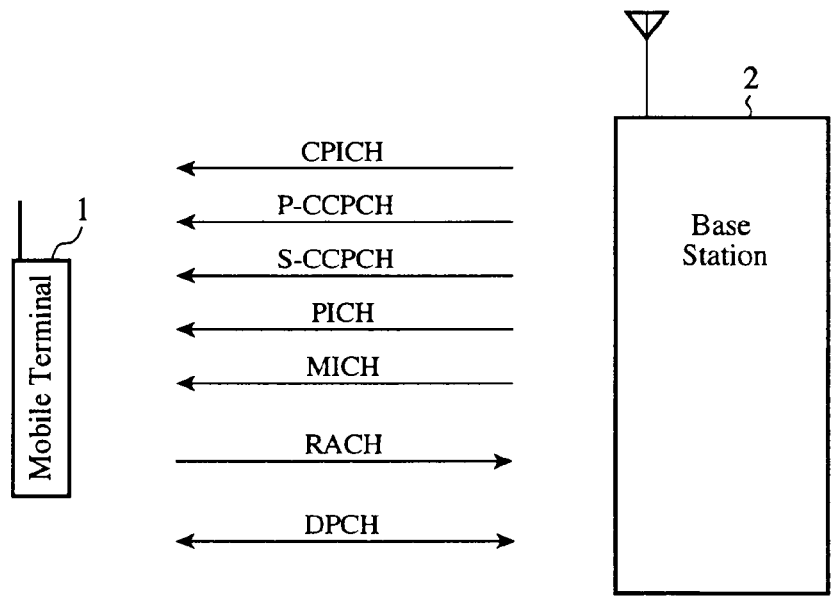
FIG. 2 is a diagram showing channels handled by the mobile communications system in accordance with the present invention.

FIG. 2 is a diagram showing the channels handled by the mobile communications system in accordance with the present invention, and shows the channels used for packet communications, such as MBMS. First, downlink physical channels from a base station 2 to a mobile terminal 1 include a CPICH, a P-CCPCH, an S-CCPCH, a PICH, and an MICH.

The CPICH (Common Pilot CHannel) is a channel used to perform the estimation of channels and a cell search in the mobile terminal 1, and broadcast the timing references of all the downlink physical channels in the cell by the base station 2, and is transmitted to all the mobile terminals 1 existing within the cell.

The P-CCPCH (Primary-Common Control Physical CHannel) is a channel used to broadcast other broadcast information to each of all the mobile terminals 1 existing within the cell. Furthermore, via the P-CCPCH, a BCH (Broadcast CHannel; channel for broadcast information) is transmitted. A BCCH (Broadcast Control CHannel; broadcast information control channel) is mapped to the BCH.

The S-CCPCH (Secondary-Common Control Physical CHannel) is a channel used to transmit signaling and data to each of the mobile terminals 1 existing within the cell, and two or more S-CCPCHs are allowed to be provided. Via the S-CCPCH, a PCH (Paging CHannel; channel for paging) and an FACH (Forward Link Access CHannel; forward access channel) are transmitted. A PCCH (Paging Control CHannel; paging control channel) is mapped to the PCH.

The BCCH (Broadcast Control CHannel; broadcast information control channel), a CCCH (Common Control Channel; common control channel), a CTCH (Common Traffic CHannel; common traffic channel), a DCCH (Dedicated Control CHannel; dedicated control channel), a DTCH (Dedicated Traffic CHannel; dedicated traffic channel), an MCCH (MBMS point-to-multipoint Control CHannel; MBMS control channel), and an MTCH (MBMS point-to-multipoint Traffic CHannel; MEMS traffic channel) are mapped to the FACH.

The PICH (Paging Indicator CHannel) is a channel used for transmission of an indicator for downlink paging, and the MICH (MBMS Notification Indicator CHannel) is a channel used for transmission of an indicator for notification of downlink MBMS.

As an uplink shared channel from a mobile terminal 1 to a base station 2, there is an RACH (Random Access CHannel), and this channel is used for transmission of control information and short packets from the mobile terminal 1 to the base station 2. A DPCH (Dedicated Physical CHannel) is used as both a channel in an uplink direction and a channel in a downlink direction, and is independently set up as a channel used for communications between a specific mobile terminal 1 and a base station 2. This DPCH is used for communications of individual data, such as audio data or data, and for signaling by an upper layer.

The DPCH has a DPDCH (Dedicated Physical Data CHannel) via which data are transmitted, and a DPCCH (Dedicated Physical Control CHannel) via which bits about control are transmitted. A DCH (Dedicated CHannel) is transmitted via the DPCH. A DCCH and a DTCH are mapped to the DCH.

The DPCH is called a dedicated channel because the DPCH is used by each mobile terminal 1, while the other channels are called shared channels because they are shared by a plurality of mobile terminals 1.

In the above-mentioned explanation, the configuration of the channels in the wireless section between a base station 2 and a mobile terminal 1 in a W-CDMA system is described, though this configuration can be applied to another communications system. As the above-mentioned channels, any types of channels can be used as long as similar data can be transmitted by using the channels. For example, a single channel can be shared by the above-mentioned plurality of channels.

Hereafter, a brief description of delivery of MBMS data by the mobile communications system in accordance with the present invention will be made with reference to FIGS. 1 and 2. Although there may be a case in which a mobile terminal 1 makes a request for a service, delivery of MEMS data will be explained by taking, as an example, a case in which data are delivered from a content server.

First, a content provider in the external network transmits multimedia data (MBMS data) or the like to the service center 6. The service center 6 stores the multimedia data received from the content provider therein, and also transfers this multimedia data to the SGSN 4, which manages mobile terminals 1 each of which uses a multimedia service, via the GGSN 5.

The SGSN 4 transmits the multimedia data to the base stations 2 via the base station control apparatuses 3, and each of the base stations 2 delivers the multimedia data to each mobile terminal 1 existing within the cell which each of the base stations 2 manages by using the S-CCPCH. Each mobile terminal 1 receives the S-CCPCH data from either one of the base stations 2 to receive the multimedia data from the base station 2. At this time, if a mobile terminal 1 is located at a cell edge or the like and does not have a good state of reception of the S-CCPCH data transmitted from one base station 2, the mobile terminal 1 also receives the S-CCPCH data transmitted from another base station 2 and then performs selective combining on the two or more channels, thereby providing an improvement in the reception quality.

Next, each mobile terminal 1 which constructs the mobile communications system in accordance with the present invention will be explained.

Figure 3:
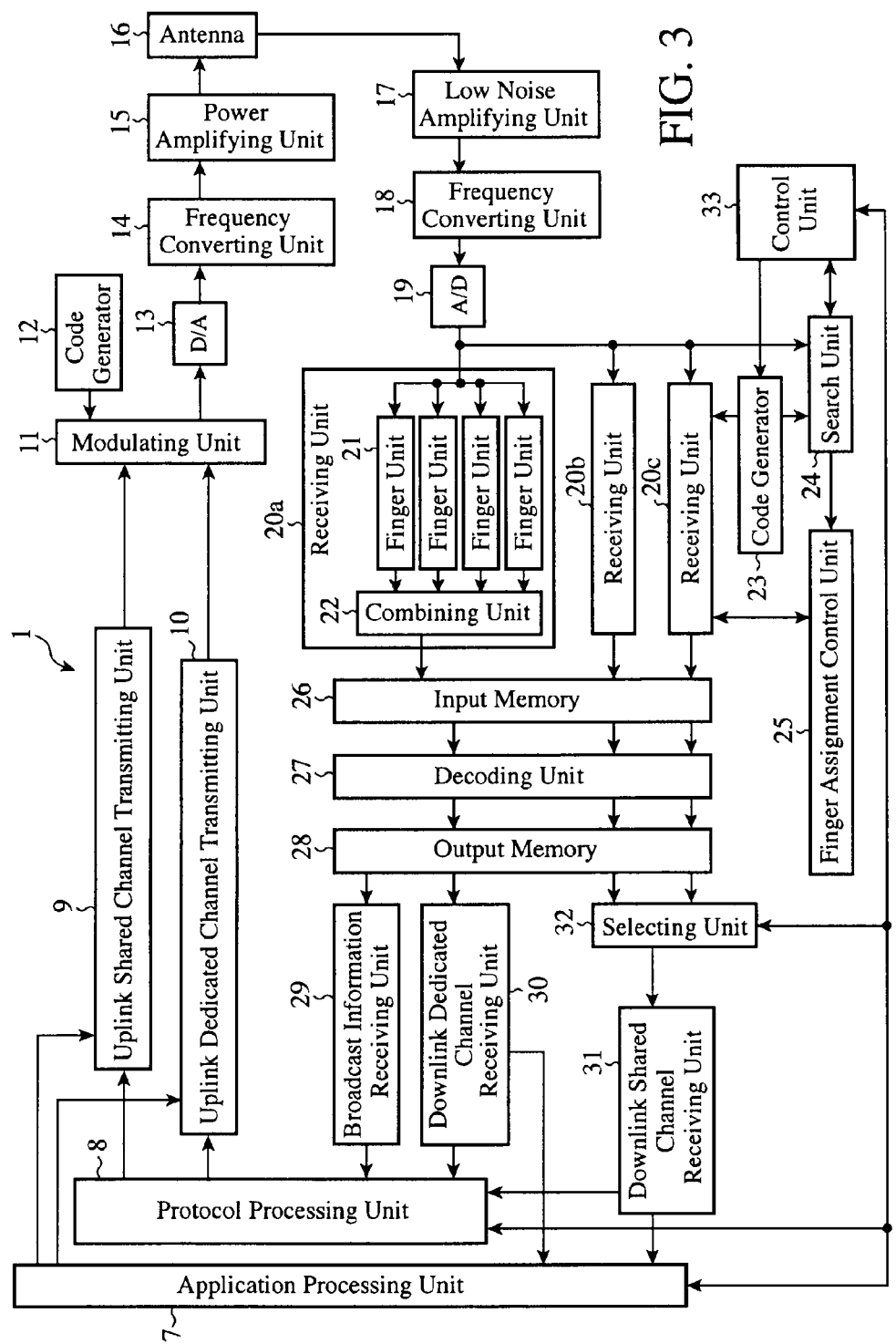
FIG. 3 is a diagram showing the structure of a mobile terminal shown in FIG. 1.

FIG. 3 is a diagram showing the structure of each mobile terminal shown in FIG. 1. As shown in FIG. 3, each mobile terminal 1 is provided with an application processing unit 7, a protocol processing unit 8, an uplink shared channel transmitting unit 9, an uplink dedicated channel transmitting unit 10, a modulating unit 11, a code generator 12, a D/A converter 13, a frequency converting unit 14, a power amplifying unit 15, an antenna 16, a low noise amplifying unit 17, a frequency converting unit 18, an A/D converter 19, receiving units 20*a* to 20*c*, a code generator 23, a search unit 24, a finger assignment control unit 25, an input memory 26, a decoding unit 27, an output memory 28, a broadcast information receiving unit 29, a downlink dedicated channel receiving unit 30, a downlink shared channel receiving unit 31, a selecting unit 32, and a control unit 33.

The application processing unit 7 carries out conversion processes, such as audio codec and image codec, key inputs, and a man machine interface process, such as a display of an image on a not-shown display unit, and furnishes data to be transmitted, information such as a transmission request, etc. to the uplink shared channel transmitting unit 9 or the uplink dedicated channel transmitting unit 10. The protocol processing unit 8 carries out a process relating to communications control, such as a channel setup, a channel release, or a handover, according to a request or the like which is inputted thereto from the application processing unit 7. For example, when each mobile terminal 1 performs calling processing, the application processing unit 7 accepts an input of a telephone number from the user and then issues a calling request to the protocol processing unit 8. Furthermore, the protocol processing unit 8 carries out a connection process of connecting with a base station 2 according to the protocol determined by a communications standard by controlling the uplink shared channel transmitting unit 9 and the uplink dedicated channel transmitting unit 10 in order to transmit required control information.

Each of the uplink shared channel transmitting unit 9 and the uplink dedicated channel transmitting unit 10 performs a coding process, such as turbo coding, a control process of controlling transmission timing, or the like on the data to be transmitted, and output coded data to the modulating unit 11. Using a channelization code and a scrambling code which are generated by the code generator 12, the modulating unit 11 spreads and modulates the signal outputted from the uplink shared channel transmitting unit 9 or the uplink dedicated channel transmitting unit 10. The modulated signal is converted from digital data into an analog signal by the D/A converter 13, and is further converted into an RF (Radio Frequency) signal by the frequency converting unit 14. The power amplifying unit 15 amplifies the converted signal in such a way that the converted signal has desired electric power, and outputs the amplified signal to the antenna 16. The antenna 16 transmits the amplified signal, as a radio signal, to a base station 2.

The low noise amplifying unit 17 amplifies the electric power of a weak signal received via the antenna 16. The frequency converting unit 18 converts the signal amplified by the low noise amplifying unit 17 into a baseband signal. The A/D converter 19 converts the analog baseband signal inputted thereto from the frequency converting unit 18 into a digital signal. Each of the receiving units 20*a* to 20*c* is provided with a plurality of finger units 21 and a combining unit 22 for combining the outputs of these finger units, and carries out de-spreading of the received signal of each path by using a channelization code and a scrambling code which are inputted thereto from the code generator 23 and carries out rake combining of the de-spread results so as to receive a signal on the channel assigned thereto. The plurality of finger units 21 which are disposed in each of the receiving units 20*a* to 20*c* receive the signal of each path assigned by the finger assignment control unit 25, and carry out signal processing, such as de-spreading and phase correction. The combining unit 22 inputs the signals processed by the finger units 21 and performs rake combining on the signals.

The code generator 23 generates the channelization code and the scrambling code which are used for the demodulation process of demodulating the received signals which is carried out by the receiving units 20*a* to 20*c* according to control by the control unit 33, and outputs the channelization code and the scrambling code to the receiving units 20*a* to 20*c*. According to the control by the control unit 33, the search unit 24 performs a cell search and multipath detection on the digital signal to which the analog baseband signal is converted by the A/D converter 19, and outputs the detected results to each of the receiving units 20*a* to 20*c*. The finger assignment control unit 25 assigns the path of a channel via which a signal is to be received to each finger unit 21.

The input memory 26 stores the signal which is rake-combined by the combining unit 22 of each of the receiving units 20*a* to 20*c* therein. The decoding unit 27 performs decoding processing, such as a CRC check and turbo decoding, on data read from the input memory 26. The output memory 28 stores the data on which decoding processing is performed by the decoding unit 27 therein. The memories 26 and 28 can be memories independently disposed for each of the receiving units. As an alternative, the receiving units 20a to 20c can share a single large memory.

The broadcast information receiving unit 29 reads required broadcast information from BCH decoded data stored in the output memory 28, and outputs the required broadcast information to the protocol processing unit 8. Each of the downlink dedicated channel receiving unit 30 and the downlink shared channel receiving unit 31 outputs decoded application data read from the output memory 28 to the application processing unit 7, and also outputs data which are decoded control information to the protocol processing unit 8. The selecting unit 32 outputs the decoded data read from the output memory 28 to the downlink shared channel receiving unit 31 according to the control by the control unit 33. The control unit 33 controls the processes carried out by the above-mentioned components 7 to 32. That is, only a part of all signal wires from the control unit 33 to the components is shown in FIG. 3, and the control unit 33 also controls the processes carried out by components for which no signal wires are shown in the figure.

Hereafter, a process of receiving data from a base station 2 which is carried out by each mobile terminal 1 will be explained.

A weak signal received by the antenna 16 is amplified by the low noise amplifying unit 17, and is converted into a baseband signal by the frequency converting unit 14. The A/D converter 19 converts the analog baseband signal into a digital signal, and outputs the digital signal to the receiving units 20a to 20c and the search unit 24. The search unit 24 identifies the scrambling code of the base station 2 from the inputted digital signal, informs the scrambling code to the control unit 33, and also detects the path timing from this digital signal and then informs the detected timing to the receiving units 20a to 20c and the finger assignment control unit 25. Furthermore, on the basis of information about the cell specified by the search unit 24, the control unit 33 provides an instruction showing which channel of which cell should be received for each of the receiving units 20a to 20c.

The finger assignment control unit 33 selects a path which is assumed to be effective from among a plurality of paths on the basis of the search results obtained by the search unit 24, and assigns the selected path to each finger unit 21. According to the control by the control unit 33, the code generator 23 generates the scrambling code corresponding to the base stations 2 of each cell from which the mobile terminal is going to receive signals, and the channelization code of the channel via which the mobile terminal is going to receive signals, and outputs the scrambling code and the channelization code to the receiving units 20a to 20c.

The control unit 33 determines whether to perform selective combining by, for example, comparing at least one of the channel quality information (CQI information) about the uplink/downlink channels in the decoding unit 27, the frequency of occurrence of CRC (Cyclic Redundancy Check) errors, and received power, such as a signal-power-to-interference-received-power ratio, with a given threshold. When performing selective combining, the control unit 33 controls the code generator 23 in such a way that the receiving units 20a to 20c receive S-CCPCHs for the MBMS from different base stations 2, respectively.

As shown in FIG. 3, each mobile terminal 1 has the three receiving units 20a to 20c, and, for example, the receiving unit 20a receives an S-CCPCH for control information and the receiving unit 20b receives an S-CCPCH for the MEMS. Furthermore, the receiving unit 20c receives an S-CCPCH for the MBMS from another base station 2 for selective combining. The receiving units 20a to 20c can receive signals on these channels at independent timings, respectively.

The finger units 21 of each of the receiving units 20a to 20c receive the signals of their respective paths assigned thereto by the finger assignment control unit 25 on the basis of the codes inputted thereto from the code generator 23, and performs signal processing, such as de-spreading and phase correction, on the signals, and outputs these signals processed thereby to the combining unit 22. The combining unit 22 inputs the signals processed by the finger unit 21, and carries out rake combining of the signals to generate and store a rake-combined signal in the input memory 26.

The decoding unit 27 reads the received data processed by the receiving units 20a to 20c from the input memory 26, performs decoding processing, such as data CRC and turbo decoding, on the received data, and writes the decoded results in the output memory 28. In general, because the hardware of a decoder has a large circuit scale, the single unit is time-shared in many cases. However, in a case in which a plurality of decoders are mounted, a decoder can be assigned to each and every cell or each and every channel.

After that, a required process is carried out for each and every channel, the broadcast information receiving unit 29 acquires required broadcast information from the BCH, and delivers the required broadcast information to the protocol processing unit 8. When the decoded data are application data, the downlink dedicated channel receiving unit 30 sends the data to the application processing unit 7, whereas when the decoded data are control information, the downlink dedicated channel receiving unit sends the data to the protocol processing unit 8.

When carrying out the selective combining, the selecting unit 32 reads the two sets of data on the S-CCPCHs for the MBMS, which the receiving units 20b and 20c have received from the different base stations 2, from the output memory 28, and outputs the set of read data which the selecting unit 32 assumes to be correct on the basis of the CRC results or the like obtained by the decoding unit 27 to the downlink shared channel receiving unit 31, and discards the other set of read data.

In contrast, when not performing the selective combining, the selecting unit 32 outputs the two sets of data which the receiving units 20b and 20c have received to the downlink shared channel receiving unit 31 without discarding them. When the received data are application data, the downlink shared channel receiving unit 31 sends the data to the application processing unit 7, whereas when the received data are control information, the downlink shared channel receiving unit sends the data to the protocol processing unit 8, like the downlink dedicated channel receiving unit 30.

As mentioned above, the S-CCPCH received by each of the receiving units 20a to 20c includes S-CCPCH system information (Secondary CCPCH system information) and S-CCPCH information (Secondary CCPCH information), and each mobile terminal 1 can acquire information required for demodulation of the spreading factor about the S-CCPCH, the channelization code, the timing offset, etc. from these pieces of information. These parameters are received, as control information, by either one of the broadcast information receiving unit 29, the downlink dedicated channel receiving unit 30, and the downlink shared channel receiving unit 31, and are stored and managed by the protocol processing unit 8. The protocol processing unit 8 sets the above-mentioned parameters to the receiving units 20a to 20c, the code generator 23, the search unit 24, and the finger assignment control unit 25.

In order to receive an S-CCPCH for control information only from one active cell, each mobile terminal 1 does not combine signals from different cells. At this time, the finger assignment control unit 25 assigns only a multipath component from one cell to each finger unit 21. The control unit 33 also observes signals (electric waves) from the base stations 2 from which the receiving units 20a to 20c have received the S-CCPCH signals, and transmits transmission power control information used for making a request to increase or decrease the transmission power to the protocol processing unit 8 according to the observation results. The protocol processing unit 8 transmits the transmission power control information inputted from the control unit 33 to the base stations 2 by using the uplink shared channel transmitting unit 9 or the uplink dedicated channel transmitting unit 10.

Figure 4:
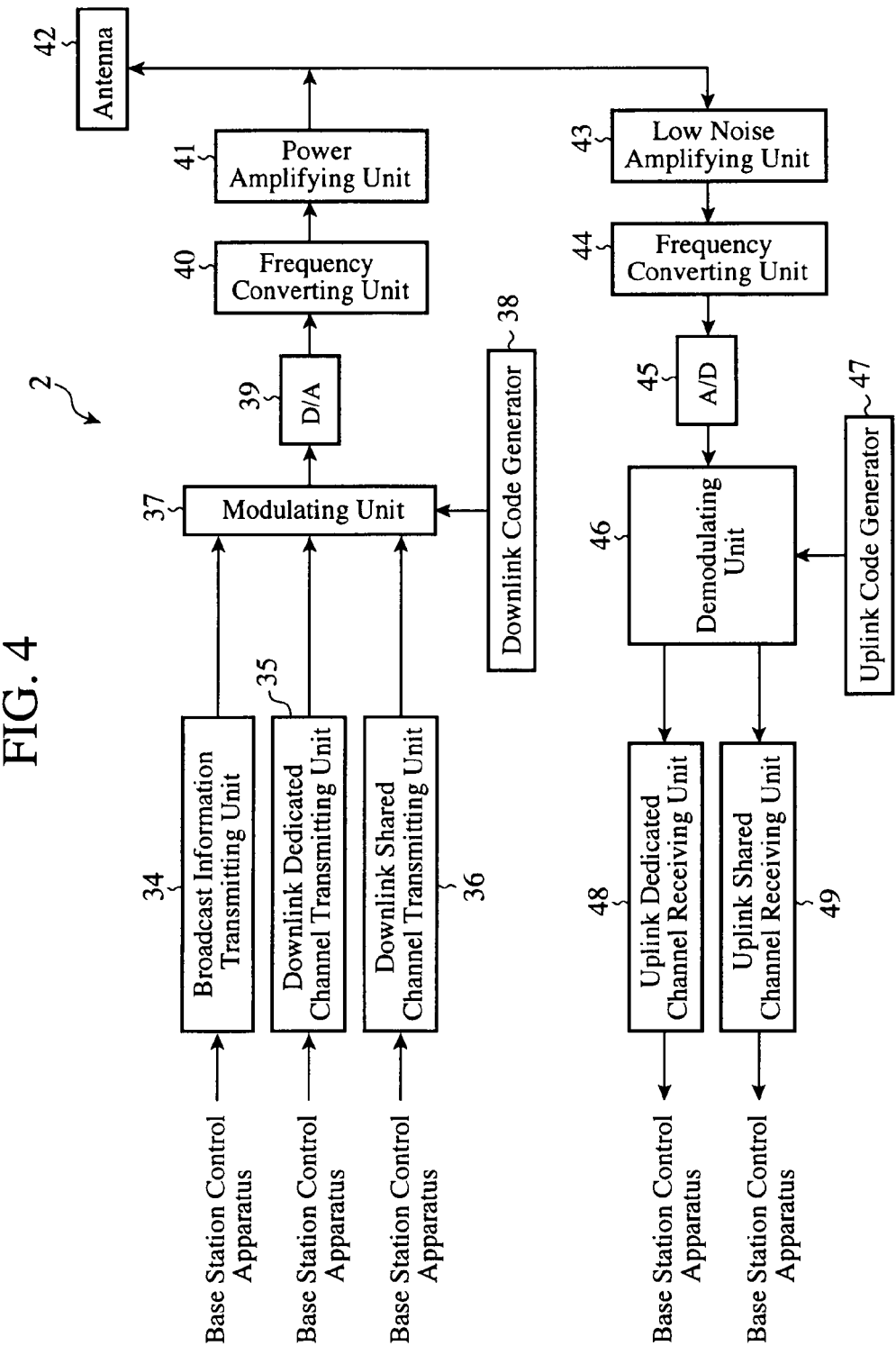
FIG. 4 is a diagram showing the structure of a base station shown in FIG. 1.

Next, each base station (Node-B) which constructs the mobile communications system in accordance with the present invention will be explained. FIG. 4 is a diagram showing the structure of each base station shown in FIG. 1. As shown in FIG. 4, in addition to an antenna 42, each base station 2 is provided with, as components for transmitting data to a mobile terminal 1, a broadcast information transmitting unit 34, a downlink dedicated channel transmitting unit 35, a downlink shared channel transmitting unit 36, a modulating unit 37, a downlink code generator 38, a D/A converter 39, a frequency converting unit 40, and a power amplifying unit 41. Each base station 2 is further provided with, as components for receiving a signal from a mobile terminal 1, a low noise amplifying unit 43, a frequency converting unit 44, an A/D converter 45, a demodulating unit 46, an uplink code generator 47, an uplink dedicated channel receiving unit 48, and an uplink shared channel receiving unit 49.

The broadcast information transmitting unit 34 receives broadcast information to be transmitted to a mobile terminal 1 via a base station control apparatus 3, and carries out a coding process of coding the broadcast information to generate data to be carried on the P-CCPCH. The downlink dedicated channel transmitting unit 35 is disposed for each and every mobile terminal 1 using a dedicated channel, and receives data or control information on the dedicated channel via a base station control apparatus 3 and then carries out a coding process of coding the data or control information to generate data to be carried on the DPCH. Furthermore, the downlink shared channel transmitting unit 36 receives control information or multimedia data via a base station control apparatus 3, and carries out a coding process of coding the control information or multimedia data to generate data to be carried on the S-CCPCH. In each base station 2, one or more S-CCPCHs can be provided.

In accordance with the present invention, an emergency information flag indicating the presence or absence of emergency information is newly disposed in the MCCH to be transmitted via the S-CCPCH. When receiving multimedia data which are emergency information via a base station control apparatus 3, the downlink shared channel transmitting unit 36 sets a digital value showing "presence" to the emergency information flag included in the MCCH. For example, in a case in which 1 bit of digital data is set up as the emergency information flag, a digital value of 1 shows the presence of emergency information while a digital value of 0 shows the absence of emergency information.

The modulating unit 37 accepts the data coded by the transmitting units 34 to 36, and performs a spreading process on the data on each and every channel by using the channelization code and the scrambling code which are set up by the downlink code generator 38. The D/A converter 39 converts the digital data on which the spreading process is performed by the modulating unit 37 into an analog signal. The frequency converting unit 40 converts the analog signal to which the digital data are converted by the D/A converter 39 into an RF signal. The power amplifying unit 41 amplifies the electric power of the RF signal to which the analog signal is converted by the frequency converting unit 40. The power amplifying unit 41 controls its amplification degree on the basis of the transmission power control information received from the mobile terminal 1. The antenna 42 transmits, as a radio signal, the signal amplified by the power amplifying unit 41, and also receives a signal from a mobile terminal 1.

The low noise amplifying unit 43 amplifies the weak signal power received from the mobile terminal 1 via the antenna 42. The frequency converting unit 44 converts the signal amplified by the low noise amplifying unit 43 into a baseband signal. The A/D converter 45 converts the analog baseband signal inputted thereto from the frequency converting unit 44 into a digital signal. The demodulating unit 46 demultiplexes the digital signal into data from the mobile terminal 1 by using the scrambling code set up by the uplink code generator 47, and demultiplexes the data into data on each channel of this mobile terminal 1 by using the channelization code. The uplink dedicated channel receiving unit 48 carries out channel decoding of the signal on the dedicated channel which is demodulated by the demodulating unit 46 to demultiplex, and transmits the signal of the dedicated channel to a base station control apparatus 3. The uplink shared channel receiving unit 49 carries out channel decoding of the signal of the shared channel which is demodulated by the demodulating unit 46 to demultiplex, and transmits to a base station control apparatus 3.

Next, a data transmission process of transmitting data to a mobile terminal 1 which is carried out by each base station 2 will be explained.

Various pieces of control information or data to be transmitted to a mobile terminal 1 are received via a base station control apparatus 3, and are sent to the transmitting units 34 to 36 which transmit control information or data about channels associated therewith, respectively. Broadcast information on which a coding process is performed as data on the P-CCPCH is sent to the modulating unit 37 by the broadcast information transmitting unit 34, control information or data on which a coding process is performed as data on the DPCH are sent to the modulating unit 37 by the downlink dedicated channel transmitting unit 35, and control information or multimedia data on which a coding process is performed as data on the S-CCPCH are sent to the modulating unit 37 by the downlink shared channel transmitting unit 36. The modulating unit 37 carries out a spreading process of the data, which are inputted from either one or more of the transmitting units 34 to 36, for each and every channel by using the channelization code and the scrambling code which are inputted from the downlink code generator 38, and then outputs the spread data to the D/A converter 39. The D/A converter 39 converts the digital signal inputted from the modulating unit 37 into an analog signal, and the frequency converting unit 40 further converts the analog signal to which the digital signal is converted by the D/A converter 39 into an RF signal. This RF signal is amplified so as to have desired electric power by the power amplifying unit 41, and is transmitted, as a radio signal, to the mobile terminal 1 via the antenna 42.

Next, a data receiving process of receiving data from a mobile terminal 1 which is carried out by each base station 2 will be explained.

A weak signal from mobile terminals 1 received via the antenna 42 is amplified by the low noise amplifying unit 43. The frequency converting unit 44 converts the signal amplified by the low noise amplifying unit 43 into a baseband signal, and the A/D converter 45 converts the baseband signal into a digital signal. The demodulating unit 46 demultiplexes the digital signal into signals from the mobile terminals 1 existing within the cell managed by each base station in question by using the scrambling code set up by the uplink code generator 47, and demultiplexes the signal from each of the mobile terminals into signals on channels of each of the mobile terminals 1 by using the channelization code set up by the uplink code generator 47. The signal on the dedicated channel, among the signals demodulated by the demodulating unit 46, is sent to the uplink dedicated channel receiving unit 48, while the signal on the shared channel, among the signals reproduced by the demodulating unit 46, is sent to the uplink shared channel receiving unit 49. Each of the uplink dedicated channel receiving unit 48 and the uplink shared channel receiving unit 49 carries out channel decoding (decoding) of the signal inputted thereto, and transmits the channel-decoded signal to a base station control apparatus 3.

Figure 5:
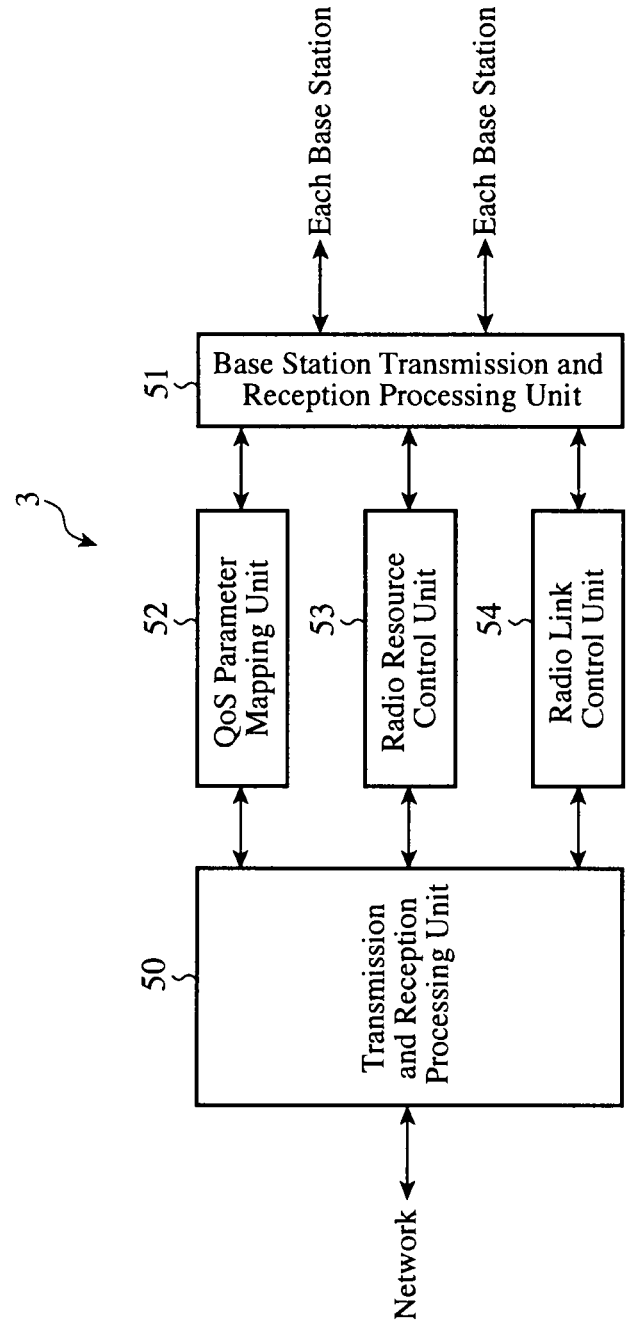
FIG. 5 is a diagram showing the structure of a base station control apparatus shown in FIG. 1.

Next, each base station control apparatus 3 which constructs the mobile communications system in accordance with the present invention will be explained. FIG. 5 is a diagram showing the structure of each base station control apparatus shown in FIG. 1. In FIG. 5, each base station control apparatus 3 relays between a process on a core network, and the wireless circuit of each base station 2, has a function of mainly managing radio resources to establish or release channels to each base station 2, and so on, and includes a transmission and reception processing unit 50, a base station transmission and reception processing unit 51, a QoS parameter mapping unit 52, a radio resource control unit 53, and a radio link control unit 54.

The transmission and reception processing unit 50 is a component for connecting with either the core network or another base station control apparatus 3, and performs either a communications protocol processing based on a protocol such as RANAP (Radio Access Network Application Part) on the core network, or a communications protocol processing based on a protocol such as RNSAP (Radio Network Subsystem Application Part) on another RNC. The base station transmission and reception processing unit 51 performs a communications protocol processing based on a protocol such as NBAP (Node B Application Part) on each base station 2. The QoS parameter mapping unit 52 acquires the parameters of a radio channel which satisfies requirements on the basis of a QoS (Quality of Service) instruction from the core network.

The radio resource control unit 53 performs a process regarding radio resources, and also informs control information and the parameters to each mobile terminal 1 by using RRC signaling. The radio link control unit 54 performs buffering and retransmission control in a radio link. The division of the functions among these components is defined logically, and the functions are not necessarily divided clearly in a case in which they are actually implemented via hardware and software.

Next, the operation of the mobile communications system in accordance with Embodiment 1 of the present invention will be explained.

Figure 6:
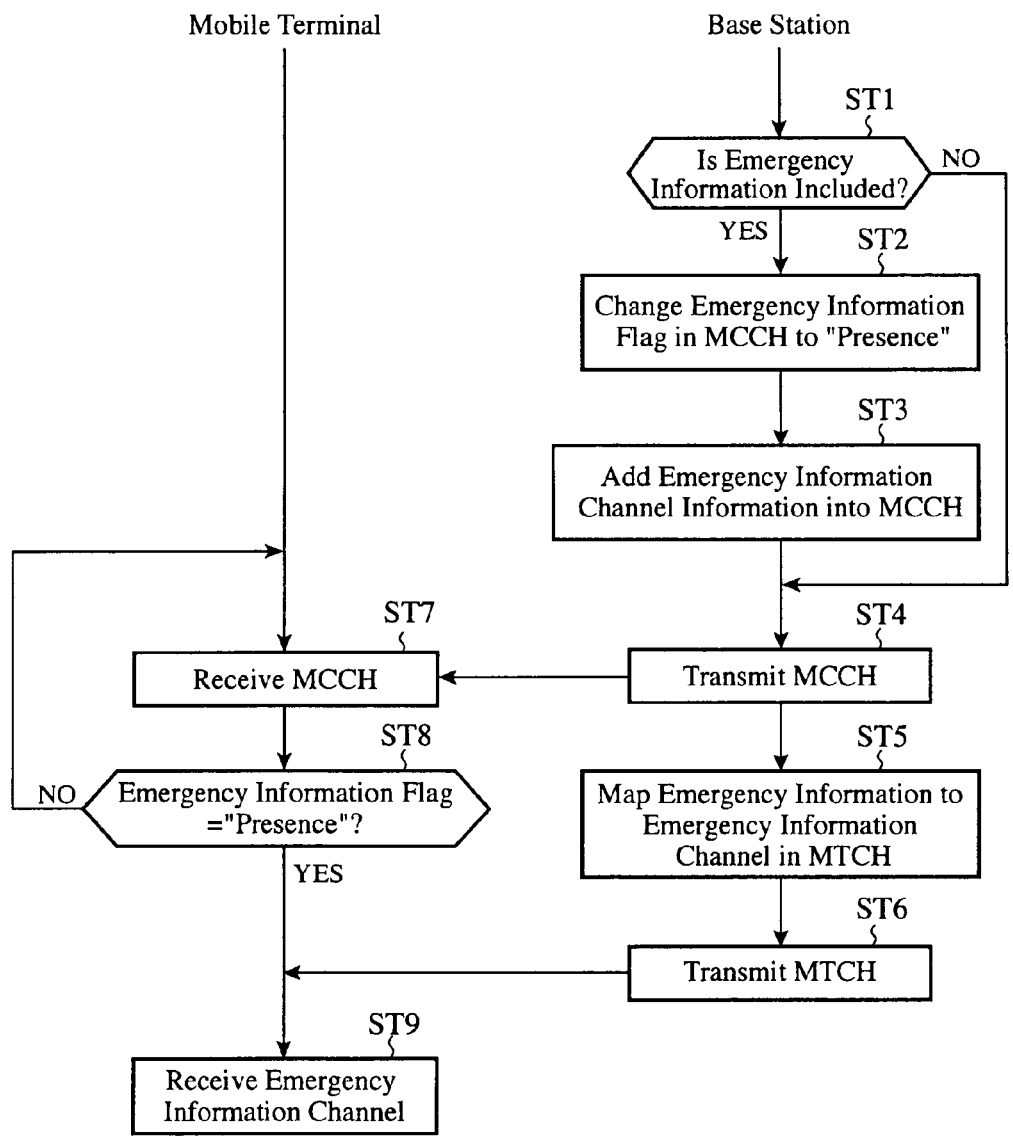
FIG. 6 is a flow chart showing a notification process of notifying emergency information which is carried out by a mobile communications system in accordance with Embodiment 1.

FIG. 6 is a flow chart showing a notification process of notifying emergency information which is carried out by the mobile communications system in accordance with Embodiment 1, and the details of the operation will be explained with reference to this figure. In Embodiment 1, a case in which when a base station 2 is transmitting MBMS data which are not emergency information and a mobile terminal 1 is receiving the MBMS data which is not emergency information, the base station notifies emergency information to this mobile terminal 1 will be described.

First, the content provider transmits multimedia data to be transmitted to the mobile terminal 1 to the service center 6. The service center 6 stores the multimedia data in the internal memory thereof, and also transfers the multimedia data to the SGSN 4 that manages the mobile terminal 1 using this multimedia service via the GGSN 5. The SGSN 4 transmits the multimedia data to the base station 2 via a base station control apparatus 3.

The base station 2 determines whether or not emergency information is included in the multimedia data received from the base station control apparatus 3 (step ST1). For example, the downlink shared channel transmitting unit 36 of the base station 2 determines the presence or absence of emergency information by determining whether or not it has received multimedia data which are emergency information. The multimedia data which are emergency information transmitted to the base station 2 can be either so-called wide area emergency information having the same description among a large number of base stations 2, or so-called local emergency information limited to a local area and having the same description in only the base station 2 or among a small number of base stations 2.

When, in step ST1, determining that there is no emergency information, the base station makes a transition to a process of step ST4. In contrast, when determining that there is emergency information, the downlink shared channel transmitting unit 36 of the base station 2 sets a digital value showing "presence" to the emergency information flag included in the MCCH to be transmitted via the S-CCPCH used for transmission of the multimedia data which are emergency information (step ST2). For example, in a case in which the emergency information flag is one bit of digital data, and is defined in such a way that a digital value of 1 shows the presence of emergency information and a digital value of 0 shows the absence emergency information, the downlink shared channel transmitting unit 36 changes the value of the emergency information flag from the digital value of 0 to the digital value of 1.

Next, the base station 2 adds information (referred to as emergency information channel information from here on) required for the mobile terminal 1 to receive the emergency information channel to the MCCH (step ST3). In this case, as the emergency information channel information, for example, emergency information channel number can be considered. This emergency information channel information is added to the MCCH by the downlink shared channel transmitting unit 36.

In a case in which the emergency information channel information is determined in advance by the mobile communications system, and both the mobile terminal 1 and the base station 2 in this mobile communications system recognize this information, the base station 2 does not need to deliver this information to the mobile terminal 1. In this case, step ST3 can be omitted. By thus omitting this step, the processing load on the base station 2 can be reduced, and the radio resources can be used effectively for the other processes.

As an alternative, in a case in which the emergency information channel information is determined by the base station 2, step ST3 can be omitted when this base station 2 delivers the emergency information channel information to mobile terminals 1 existing within the cell thereof and being under the control thereof in advance. For example, the broadcast information transmitting unit 34 of the base station 2 sets this information as a part of broadcast information and delivers the broadcast information to the mobile terminals in advance by using the P-CCPCH. Also by doing in this way, the processing load on the base station 2 can be reduced, and the radio resources can be used effectively for the other processes.

When, in step ST1, determining that there is no emergency information, or when the process of step ST3 is completed, the base station 2 transmits the MCCH to the mobile terminals 1 being under the control thereof (step ST4). In contrast, when determining that there is emergency information, the downlink shared channel transmitting unit 36 of the base station 2 maps the emergency information which the base station 2 has received via the base station control apparatus 3 to the emergency information channel included in the MTCH (step ST5). After that, through the above-mentioned transmitting process, the base station 2 transmits the MTCH to the mobile terminals 1 being under the control thereof, which receive the MBMS within the cell thereof, via the antenna 42 (step ST6). The order of the processes of steps ST2 to ST5 can be arbitrary, or these processes can be simultaneously carried out.

When receiving the MCCH transmitted from the base station 2 (step ST7), the mobile terminal 1 determines the presence or absence of emergency information from the value of the emergency information flag included in this MCCH (step ST8). For example, the description of the MCCH received by the mobile terminal 1 is informed to the control unit 33 of the mobile terminal 1, and the control unit 33 determines the presence or absence of emergency information on the basis of the value of the emergency information flag included in the MCCH. In this case, when determining that there is no emergency information from the value of the emergency information flag, the mobile terminal returns to the process of step ST7.

In contrast, when, in step ST8, determining that there is emergency information, the mobile terminal 1 starts receiving the emergency information channel included in the MTCH according to the emergency information channel information included in the MCCH received in step ST7 (step ST9). In FIG. 3, according to the emergency information channel information, the control unit 33 controls the code generator 23 and the finger assignment control unit 25 to receive the emergency information channel included in the MTCH via the S-CCPCH for the MBMS by using the receiving unit 20*b*.

By thus disposing the emergency information flag for setting up the presence or absence of emergency information in the MCCH, a mobile terminal 1 which is receiving MBMS data can always monitor the emergency information flag by simply receiving this MCCH at all times. Therefore, the provision of the emergency information flag is very effective for delivery of emergency information to users through mobile terminals 1.

In a case in which, in step ST9, the emergency information channel information is determined in advance in the mobile communications system, and both the mobile terminal 1 and the base station 2 in this mobile communications system recognize this information, the mobile terminal 1 starts receiving the emergency information channel included in the MTCH according to this information. As an alternative, in a case in which the emergency information channel information is determined by the base station 2, this base station 2 sets the emergency information channel information as a part of broadcast information and delivers this broadcast information to the mobile terminals 1 existing within the cell thereof and being under the control thereof by using, for example, the P-CCPCH in advance. In this case, the mobile terminal 1 can start receiving the emergency information channel included in the MTCH according to the emergency information channel information delivered thereto in advance.

When, in step ST9, receiving the emergency information channel, the mobile terminal 1 can cancel information (referred to as existing information for MBMS reception from here on) required to receive MBMS data which the mobile terminal 1 has been receiving until then, or can store the existing information for MBMS reception in the internal memory thereof separately from the emergency information channel information. By thus storing the existing information for MEMS reception separately from the emergency information channel information, the mobile terminal can promptly return to the reception of MEMS data which the mobile terminal 1 has been receiving until then by using the existing information for MBMS reception when the emergency situation is released and the mobile terminal 1 does not need to receive the emergency information channel anymore (or when the transmission of the emergency information channel from the base station 2 is stopped).

When, in step ST9, receiving the emergency information channel, the mobile terminal 1 stops the reception of MBMS data which each of the mobile terminals 1 has been receiving until then. In this case, if the mobile terminal 1 has a radio capability of being able to receive a plurality of MBMS data simultaneously, the mobile terminal 1 can receive MBMS data which the mobile terminal 1 has been receiving until then, as well as data on the emergency information channel. In this case, the mobile terminal 1 needs to store the existing information for MBMS reception separately from the emergency information channel information therein.

In addition, in a case in which the mobile terminal 1 has an application capability of being able to simultaneously provide a plurality of MBMS data for the user, the mobile terminal 1 can provide MBMS data which the mobile terminal 1 has been receiving until then, as well as data on the emergency information channel, for the user. Also in this case, the mobile terminal 1 needs to store the existing information for MBMS reception separately from the emergency information channel information therein.

As mentioned above, according to this Embodiment 1, because an emergency information flag (an emergency information indicator) indicating the presence or absence of emergency information is disposed in the MCCH which mobile terminals 1 which support the MBMS can monitor, even if a mobile terminal 1 is receiving MBMS data which are not emergency information, the mobile terminal 1 can check the presence or absence of emergency information at regular intervals from the value of the emergency information flag disposed in the MCCH, and, when determining that there exists emergency information, can receive the emergency information via the emergency information channel which is a channel included in the MBMS.

Especially, because the emergency information flag (the emergency information indicator) which is disposed, as the element indicating the presence or absence of emergency information, in the MCCH can be expressed as digital data having a small number of bits, the amount of information added into the MCCH in order to apply this Embodiment 1 can be reduced.

Furthermore, because each mobile terminal 1 receives the emergency information data included in the MBMS according to the value of the emergency information flag, each mobile terminal 1 can receive the emergency information data included in the MBMS at an early time without receiving any other unnecessary information and without causing the user to perform an operation of selecting the emergency information channel when receiving the emergency information, and therefore the immediacy of the emergency information can be ensured sufficiently. In addition, because each mobile terminal 1 does not need to receive any other MCCH information even in a case in which there is no emergency information, each mobile terminal 1 can reduce its power consumption.

Furthermore, in accordance with Embodiment 1, because both the emergency information flag and the emergency information channel information are disposed in the MCCH, emergency information can be delivered with a larger amount of information as compared with a case in which, for example, information regarding emergency information is set up as broadcast information to be carried on the BCCH or the like, like in the case of the emergency information notifying system disclosed by patent reference 1.

Embodiment 2

A mobile communications system in accordance with this Embodiment 2 notifies the occurrence of emergency information to even a mobile terminal which is communicating individual data, such as data about a voice call or packets, but is not receiving any MBMS data, thereby enabling the mobile terminal to receive an emergency information channel included in an MBMS.

Although the fundamental structures of each mobile terminal, each base station, and each base station control apparatus which are disposed in the mobile communications system in accordance with Embodiment 2 are the same as those according to above-mentioned Embodiment 1 shown in FIGS. 1 to 5, they differ from those of Embodiment 1 in that when emergency information occurs, each base station transmits an MICH to mobile terminals before transmitting an MCCH, and a mobile terminal which is communicating individual data, such as data about a voice call or packets, but is not receiving any MBMS data receives the MCCH according to the description of the indicator of the MICH, and then determines the presence or absence of the emergency information from the value of an emergency information flag included in the MCCH and receives the emergency information by using the MBMS. Hereinafter, the structure of the mobile communications system in accordance with this Embodiment 2 will be explained similarly with reference to FIGS. 1 to 5.

The MICH is an indicator channel which every time when the channel information of the MBMS is updated and the description of the MCCH (MBMS control information channel) required for reception of MBMS data is updated, each base station 2 notifies to each mobile terminal 1 which supports the MEMS before transmitting the MCCH, in order to show the description of the update. More specifically, if each mobile terminal 1 receives the MICH and monitors the description of the MICH even when not receiving any MEMS data, and the description of the indicator of the MICH shows a service or service group which each mobile terminal desires to receive by using the MBMS, each mobile terminal 1 can start receiving the MCCH and can receive data about the service by using the MBMS.

In accordance with Embodiment 2, even a mobile terminal 1 in a state of not receiving any MBMS service because of a telephone call or data communications monitors the MICH and starts receiving the MCCH when the description of the indicator included in this MICH shows that emergency information is included. Each mobile terminal 1 determines the presence or absence of emergency information by detecting the emergency information flag disposed in the MCCH, like that of above-mentioned Embodiment 1. Therefore, a mobile terminal 1 which is not receiving the MBMS can check the presence or absence of emergency information at regular intervals by performing these operations at regular intervals, and, when determining that there exists emergency information from the value of the emergency information flag included in the MCCH, can receive the emergency information channel included in the MBMS.

Furthermore, in accordance with this Embodiment 2, when recognizing the existence of emergency information during communications of individual data, such as audio data or packets, each mobile terminal 1 notifies the occurrence of the emergency information to the user with vibrations, icon blinking, a display of characters, or the like. Accordingly, the mobile communications system can notify the occurrence of the emergency information to users without affecting packet communications, such as Web browsing or a telephone call.

Next, the operation of the mobile communications system will be explained.

Figure 7:
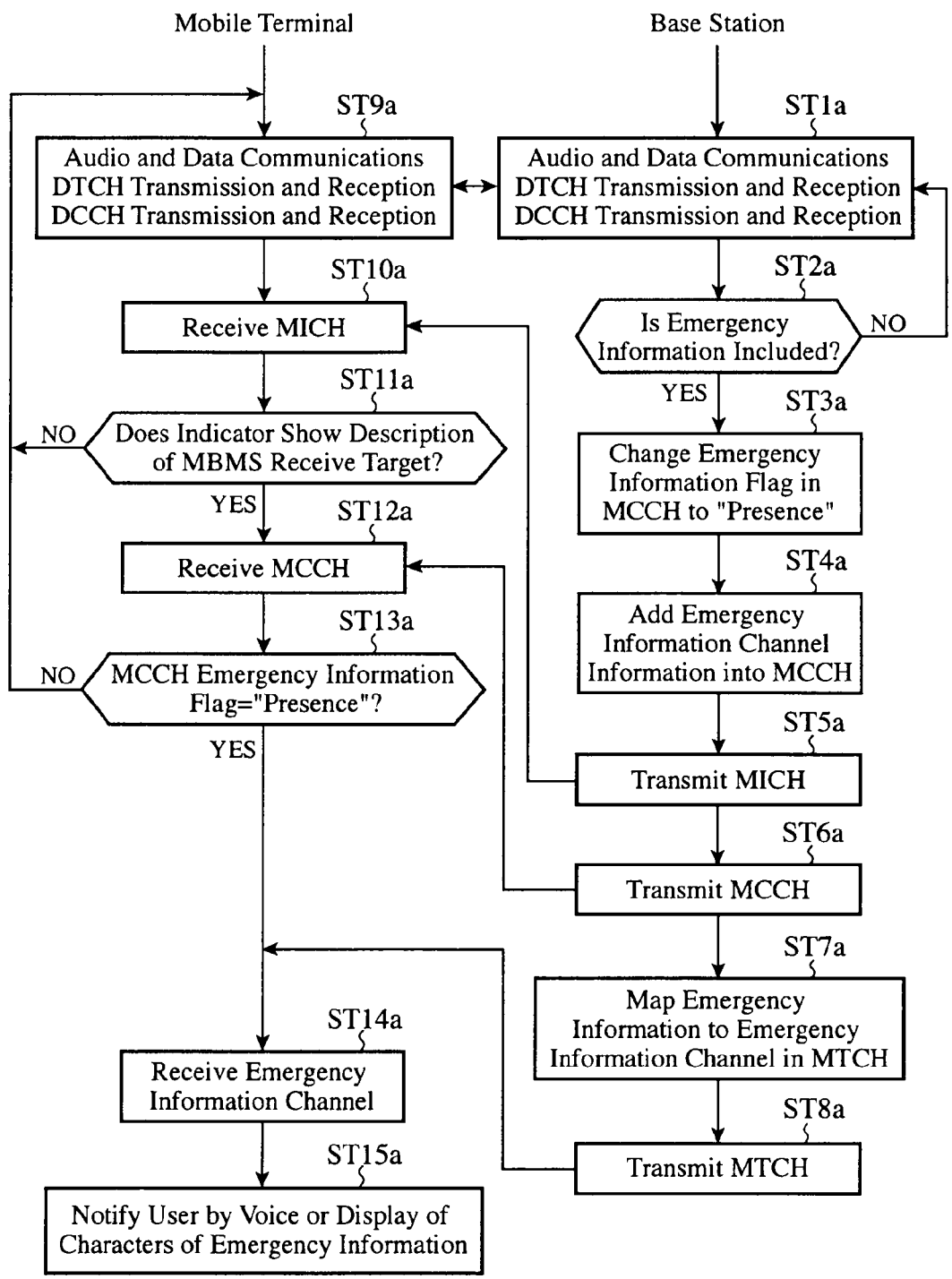
FIG. 7 is a flow chart showing a notification process of notifying emergency information which is carried out by a mobile communications system in accordance with Embodiment 2.

FIG. 7 is a flow chart showing a notification process of notifying emergency information which is carried out by the mobile communications system in accordance with Embodiment 2, and the details of the operation will be explained with reference to this figure. In Embodiment 2, a case in which a base station 2 is carrying out a voice call or data communications with a mobile terminal 1, and then notifies emergency information to this mobile terminal 1 will be described.

First, the base station 2 is communicating individual data, such as audio data or packets, with the mobile terminal 1 by using a DTCH or DCCH which is mapped to a DPCH (steps ST1a and ST9a). At this time, a content provider transmits multimedia data to be transmitted to the mobile terminal 1 to a service center 6. The service center 6 stores the multimedia data in its internal memory, and also transfers the multimedia data to an SGSN 4 which manages the mobile terminal 1 using this multimedia service via a GGSN 5. The SGSN 4 transmits the multimedia data to the base station 2 via a base station control apparatus 3.

Next, the base station 2 determines whether or not the multimedia data received from the base station control apparatus 3 have emergency information (step ST2a), like that of above-mentioned Embodiment 1. For example, a downlink shared channel transmitting unit 36 of the base station 2 determines the presence or absence of emergency information by determining whether or not it has received multimedia data which are emergency information. The multimedia data which are emergency information transmitted to the base station 2 can be either so-called wide area emergency information having the same description among a large number of base stations 2, or so-called local emergency information limited to a local area and having the same description in only the base station 2 or among a small number of base stations 2.

When, in step ST2a, determining that there is no emergency information, the base station returns to the process of step ST1a. In contrast, when determining that there is emergency information, the downlink shared channel transmitting unit 36 of the base station 2 sets a digital value showing "presence" to the emergency information flag included in the MCCH to be transmitted via an S-CCPCH used for transmitting the multimedia data which are emergency information (step ST3a). For example, in a case in which the emergency information flag is one bit of digital data, and is defined in such a way that a digital value of 1 shows the presence of emergency information and a digital value of 0 shows the absence of emergency information, the downlink shared channel transmitting unit 36 changes the value of the emergency information flag from the digital value of 0 to the digital value of 1.

Next, the base station 2 adds information (emergency information channel information) required for the mobile terminal 1 to receive the emergency information channel to the MCCH (step ST4a). In this case, as the emergency information channel information, for example, the emergency information channel number can be considered, like that of above-mentioned Embodiment 1. This emergency information channel information is added to the MCCH by the downlink shared channel transmitting unit 36.

In a case in which the emergency information channel information is determined in advance by the mobile communications system, and both the mobile terminal 1 and the base station 2 in this mobile communications system recognize this information, the base station 2 does not need to deliver this information to the mobile terminal 1. In this case, step ST4a can be omitted. By thus omitting this step, the processing load on the base station 2 can be reduced, and the radio resources can be used effectively for the other processes.

Furthermore, in a case in which the emergency information channel information is determined by the base station 2, step ST4a can be omitted when this base station 2 delivers the emergency information channel information to mobile terminals 1 existing within the cell thereof and being under the control thereof in advance. For example, a broadcast information transmitting unit 34 of the base station 2 sets this information as a part of broadcast information and delivers the broadcast information to the mobile terminals in advance by using a P-CCPCH. Also by doing in this way, the processing load on the base station 2 can be reduced, and the radio resources can be used effectively for the other processes.

After the description of the MCCH is updated in step ST4a or the process of step ST4a is omitted as mentioned above, and the existence of emergency information is recognized in step ST2a and the emergency information flag included in the MCCH is then set to "presence" in step ST3a, the base station 2 changes the digital value of the desired indicator for notification in each of MICH frames corresponding to all the services or service groups. For example, in a case in which the indicator for notification is 2-bit digital data and is set up in such a way that a digital value of 11 shows that there is a change in the MCCH and a digital value of 00 shows that there is no change in the MCCH, the base station changes the indicator for notification from the digital value of 00 to the digital value of 11. The base station 2 transmits the MICH to the mobile terminals 1 being under the control thereof (step ST5a). For example, when the MCCH is updated through the processes of the above-mentioned steps, the downlink shared channel transmitting unit 36 of the base station 2 transmits the MICH to the mobile terminals 1 via an antenna 42 by performing the transmitting process shown in above-mentioned Embodiment 1.

Next, the base station 2 transmits the MCCH to the mobile terminals 1 being under the control thereof (step ST6a). When determining that there is emergency information, the downlink shared channel transmitting unit 36 of the base station 2 maps the emergency information received via the base station control apparatus 3 to the emergency information channel included in the MTCH (step ST7a). After that, the base station 2 transmits the MTCH to the mobile terminals 1 being under the control thereof which receive the MEMS within the cell thereof via the antenna 42 by carrying out the above-mentioned transmitting process (step ST8a). The order of the processes of steps ST3a and ST4a can be arbitrary, and the processes can be carried out simultaneously.

In step ST9a, the mobile terminal 1 is transmitting and receiving individual data, such as audio data or packets, to and from the base station 2. At this time, when receiving the MICH transmitted from the base station 2 by doing in the above-mentioned way (step ST10a), the mobile terminal 1 determines whether or not the indicator included in this MICH shows the description of the MBMS receive target of the mobile terminal 1 including the emergency information channel (step ST11a).

For example, the description of the MICH received by the mobile terminal 1 is informed to a control unit 33, and the control unit 33 determines whether the description of the indicator included in the MICH shows a change in the MCCH which is the MBMS receive target of the mobile terminal 1 including the emergency information channel. In this case, when the control unit 33 determines that the description of the indicator does not show a change in the MCCH which is the MBMS receive target of the mobile terminal 1 including the emergency information channel, the mobile terminal returns to the process of step ST9a.

In contrast, when the control unit 33, in step ST11a, determines that the indicator in the MICH shows the description of the MBMS receive target of the mobile terminal 1 including the emergency information channel, the mobile terminal 1 receives the MCCH transmitted from the base station 2 in the above-mentioned way (step ST12a), and determines the presence or absence of emergency information from the value of the emergency information flag included in this MCCH (step ST13a). For example, the description of the MCCH received by the mobile terminal 1 is informed to the control unit 33, and the control unit 33 determines the presence or absence of emergency information on the basis of the value of the emergency information flag included in the MCCH. When determining that there is no emergency information from the value of the emergency information flag, the mobile terminal returns to the process of step ST9a.

When, in step ST13a, determining that there is emergency information, the mobile terminal 1 starts receiving the emergency information channel included in the MTCH which is transmitted from the base station 2 in the above-mentioned way according to the emergency information channel information included in the MCCH received in step ST12a (step ST14a).

In a case in which, in step ST14a, the emergency information channel information is determined in advance by the mobile communications system, and both the mobile terminal 1 and the base station 2 in this mobile communications system recognize this information, the mobile terminal 1 starts receiving the emergency information channel included in the MTCH according to this information. As an alternative, in a case in which the emergency information channel information is determined by the base station 2, this base station 2 sets the emergency information channel information as a part of broadcast information and delivers this broadcast information in advance to the mobile terminals 1 existing within the cell thereof and being under the control thereof by using, for example, the P-CCPCH. In this case, each of the mobile terminals 1 can start receiving the emergency information channel included in the MTCH according to the emergency information channel information delivered thereto in advance.

Thus, each of the mobile terminals 1 is constructed in such a way as to, even when communicating individual data, such as audio data or packets, with a base stations 2, but not receiving any MBMS data, receive the MICH, and, when the indicator of this MICH shows the description of the MBMS receive target including the emergency information channel, starts receiving the MCCH to be able to recognize the presence or absence of emergency information from the value of the emergency information flag. When a mobile terminal 1 is not receiving any MBMS data or when a mobile terminal 1 selects any service, the mobile terminal 1 can monitor the presence or absence of emergency information from a base station 2. Therefore, this embodiment is very effective for notification of emergency information to users through mobile terminals 1.

When starting receiving the emergency information channel, the mobile terminal 1 notifies the user that it has started receiving the emergency information with a sound, vibrations, or a display of characters on the screen thereof (step ST15a). For example, even when the mobile terminal is performing either a phone call or packet communications, the control unit 33 of the mobile terminal makes such a notification as mentioned above of the emergency information by controlling a not-shown audio output unit, vibration mechanism, or display processing unit as the mobile terminal starts receiving the emergency information channel.

As mentioned above, in the mobile communications system according to this Embodiment 2, each base station 2 transmits the MICH to mobile terminals 1 before transmitting the MCCH, and each of the mobile terminals 1 receives the MCCH according to the description of the indicator of the MICH, and then determines the presence or absence of emergency information from the value of the emergency information flag included in the MCCH to receive the emergency information by using the MBMS. Therefore, the mobile communications system can notify the occurrence of emergency information to even a mobile terminal 1 which is communicating individual data, such as audio data or packets, but is not receiving any MBMS data to enable the mobile terminal 1 to receive the emergency information channel included in the MBMS. Furthermore, the mobile communications system can notify the emergency information received via the emergency channel included in the MBMS to the user of the mobile terminal 1 which is communicating individual data.

Embodiment 3

A mobile communications system in accordance with this Embodiment 3 is constructed in such a way as to notify the occurrence of emergency information to even a mobile terminal placed in an idle state in which it is not receiving any MBMS data to enable the mobile terminal to receive an emergency information channel included in an MEMS.

Although the fundamental structures of each mobile terminal, each base station, and each base station control apparatus which are disposed in the mobile communications system in accordance with Embodiment 3 are the same as those according to above-mentioned Embodiment 1 shown in FIGS. 1 to 5, they differ from those of Embodiment 1 in that when emergency information occurs, each base station transmits an MICH to mobile terminals before transmitting an MCCH, and a mobile terminal placed in an idle state in which it is not receiving any MBMS data receives the MCCH according to the description of the indicator of the MICH, and then determines the presence or absence of the emergency information from the value of an emergency information flag included in the MCCH and receives the emergency information by using an MBMS. Hereinafter, the structure of the mobile communications system in accordance with this Embodiment 3 will be explained similarly with reference to FIGS. 1 to 5.

As shown in above-mentioned Embodiment 2, the MICH is an indicator channel which every time when the channel information of the MBMS is updated and the description of the MCCH (MBMS control information channel) required for reception of MBMS data is updated, each base station 2 notifies to a mobile terminal 1 which supports the MEMS before transmitting the MCCH, in order to show the description of the update. More specifically, if each mobile terminal 1 receives the MICH and monitors the description of the MICH even when not receiving any MBMS data, and the description of the indicator of the MICH shows a service or service group which each mobile terminal desires to receive by using the MEMS, each mobile terminal 1 can start receiving the MCCH and can receive data about the service by using the MBMS.

In accordance with Embodiment 3, even a mobile terminal 1 placed in an idle state of not receiving any MBMS service monitors the MICH and starts receiving the MCCH when the description of the indicator included in this MICH shows that emergency information is included. Each mobile terminal 1 determines the presence or absence of emergency information by detecting the emergency information flag disposed in the MCCH, like that of above-mentioned Embodiment 1. Therefore, a mobile terminal 1 which is not receiving the MEMS can check the presence or absence of emergency information at regular intervals by performing these operations at regular intervals, and, when determining that there exists emergency information from the value of the emergency information flag of the MCCH, can receive the emergency information channel included in the MBMS.

Furthermore, in accordance with this Embodiment 3, when recognizing the existence of emergency information during communications of individual data, such as audio data or packets, each mobile terminal 1 notifies the occurrence of the emergency information to the user with vibrations, icon blinking, a display of characters, or the like, like that of above-mentioned Embodiment 2. Accordingly, the mobile communications system can notify the occurrence of the emergency information to users without affecting packet communications, such as a telephone call or Web browsing.

Next, the operation of the mobile communications system will be explained.

Figure 8:
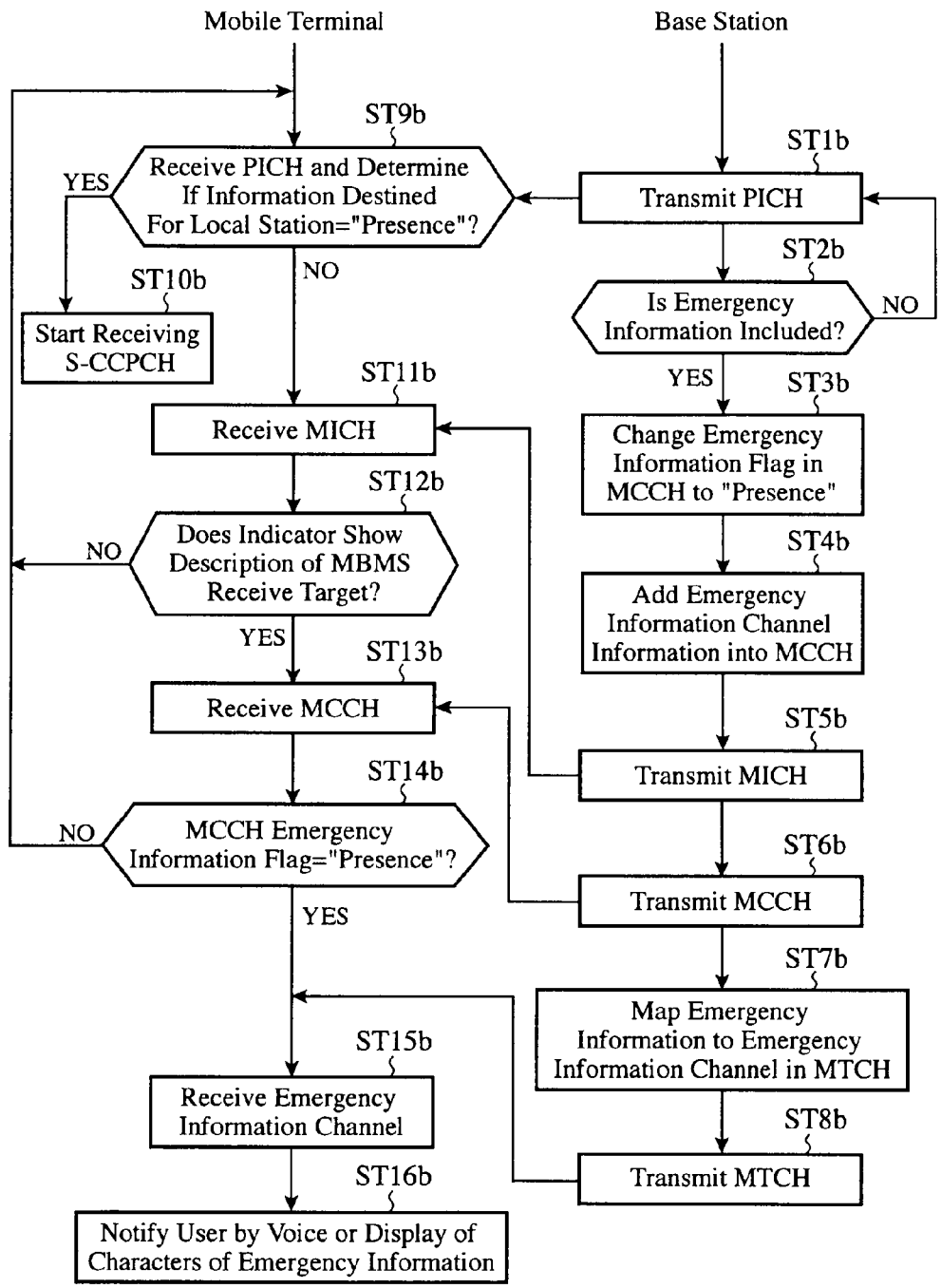
FIG. 8 is a flow chart showing a notification process of notifying emergency information which is carried out by a mobile communications system in accordance with Embodiment 3.

FIG. 8 is a flow chart showing a notification process of notifying emergency information which is carried out by the mobile communications system in accordance with Embodiment 3, and the details of the operation will be explained with reference to this figure. In Embodiment 3, a case in which the mobile communications system notifies emergency information to a mobile terminal 1 placed in an idle state in which it is not receiving any MBMS data will be described.

First, when the mobile terminal 1 is placed in an idle state, the base station 2 transmits the PICH to mobile terminals 1 existing within the cell thereof and being under the control thereof cyclically (step ST1b). At this time, a content provider transmits multimedia data to be transmitted to the mobile terminal 1 to a service center 6. The service center 6 stores the multimedia data in its internal memory, and also transfers the multimedia data to an SGSN 4 which manages the mobile terminal 1 using this multimedia service via a GGSN 5. The SGSN 4 transmits the multimedia data to the base station 2 via a base station control apparatus 3.

Next, the base station 2 determines whether or not the multimedia data received from the base station control apparatus 3 have emergency information (step ST2b), like that of above-mentioned Embodiment 1. For example, a downlink shared channel transmitting unit 36 of the base station 2 determines the presence or absence of emergency information by determining whether or not it has received multimedia data which are emergency information. The multimedia data which are emergency information transmitted to the base station 2 can be either so-called wide area emergency information having the same description among a large number of base stations 2, or so-called local emergency information limited to a local area and having the same description in only the base station 2 or among a small number of base stations 2.

When, in step ST2b, determining that there is no emergency information, the base station returns to the process of step ST1b. In contrast, when determining that there is emergency information, the downlink shared channel transmitting unit 36 of the base station 2 sets a digital value showing "presence" to the emergency information flag included in the MCCH to be transmitted via an S-CCPCH used for transmission of the multimedia data which are emergency information (step ST3b). For example, in a case in which the emergency information flag is one bit of digital data, and is defined in such a way that a digital value of 1 shows the presence of emergency information and a digital value of 0 shows the absence of emergency information, the downlink shared channel transmitting unit 36 changes the value of the emergency information flag from the digital value of 0 to the digital value of 1.

Next, the base station 2 adds information (emergency information channel information) required for the mobile terminal 1 to receive the emergency information channel to the MCCH (step ST4b). As the emergency information channel information, for example, the emergency information channel number can be considered, as in the case of above-mentioned Embodiment 1. This emergency information channel information is added to the MCCH by the downlink shared channel transmitting unit 36.

In a case in which the emergency information channel information is determined in advance by the mobile communications system, and both the mobile terminal 1 and the base station 2 in this mobile communications system recognize this information, the base station 2 does not need to deliver this information to the mobile terminal 1. In this case, step ST4b can be omitted. By thus omitting this step, the processing load on the base station 2 can be reduced, and the radio resources can be used effectively for the other processes.

Furthermore, in a case in which the emergency information channel information is determined by the base station 2, step ST4b can be omitted when this base station 2 delivers the emergency information channel information to the mobile terminals 1 existing within the cell thereof and being under the control thereof in advance. For example, a broadcast information transmitting unit 34 of the base station 2 sets this information as a part of broadcast information and delivers the broadcast information to the mobile terminals in advance by using a P-CCPCH. Also by doing in this way, the processing load on the base station 2 can be reduced, and the radio resources can be used effectively for the other processes.

After the description of the MCCH is updated in step ST4b or the process of step ST4b is omitted as mentioned above, and the existence of emergency information is recognized in step ST2b and the emergency information flag included in the MCCH is then set to "presence" in step ST3b, the base station 2 changes the digital value of the desired indicator for notification in each of MICH frames corresponding to all the services or service groups. For example, in a case in which the indicator for notification is 2-bit digital data and is set up in such a way that a digital value of 11 shows that there is a change in the MCCH and a digital value of 00 shows that there is no change in the MCCH, the base station changes the indicator for notification from the digital value of 00 to the digital value of 11. The base station 2 transmits the MICH to the mobile terminals 1 being under the control thereof (step ST5b). For example, when the MCCH is updated through the processes of the above-mentioned steps, the downlink shared channel transmitting unit 36 of the base station 2 transmits the MICH to the mobile terminals 1 via an antenna 42 by performing the transmitting process shown in above-mentioned Embodiment 1.

Next, the base station 2 transmits the MCCH to the mobile terminals 1 being under the control thereof (step ST6b). When determining that there is emergency information, the downlink shared channel transmitting unit 36 of the base station 2 maps the emergency information received via the base station control apparatus 3 to the emergency information channel included in the MTCH (step ST7b). After that, the base station 2 transmits the MTCH to the mobile terminals 1 being under the control thereof which receive the MBMS within the cell thereof via the antenna 42 by carrying out the above-mentioned transmitting process (step ST8b). The order of the processes of steps ST3b and ST4b can be arbitrary, or the processes can be carried out simultaneously.

The mobile terminal 1, in step ST9b, receives the PICH from the base station 2 and determines the presence or absence of information (PI; Paging Indicator) destined for the mobile terminal 1. For example, the description of the PICH received by the mobile terminal 1 is informed to the control unit 33, and the control unit 33 determines the presence or absence of information destined for the mobile terminal 1 from the PICH. At this time, when the control unit determines that there is information destined for the mobile terminal 1, the mobile terminal 1 starts receiving the S-CCPCH from the base station 2 on the basis of the information destined for the mobile terminal 1 (step ST10b).

In contrast, when the control unit determines that there is no information destined for the local station, the mobile terminal 1 receives the MICH which is transmitted from the base station 2 in the above-mentioned way (step ST11b), and determines whether the indicator included in this MICH shows the description of the MBMS receive target of the mobile terminal 1 including the emergency information channel (step ST12b). For example, the description of the MICH received by the mobile terminal 1 is informed to a control unit 33, and the control unit 33 determines whether the description of the indicator included in the MICH shows a change in the MCCH which is the MEMS receive target of the mobile terminal 1 including the emergency information channel. In this case, when the control unit determines that the description of the indicator does not show a change in the MCCH which is the MBMS receive target of the mobile terminal 1 including the emergency information channel, the mobile terminal returns to the process of step ST9b.

In contrast, when the control unit, in step ST12b, determines that the indicator shows the description of the MBMS receive target of the mobile terminal 1 including the emergency information channel, the mobile terminal 1 receives the MCCH which is transmitted from the base station 2 in the above-mentioned way (step ST13b), and determines the presence or absence of emergency information from the value of the emergency information flag included in this MCCH (step ST14b). For example, the description of the MCCH received by the mobile terminal 1 is informed to the control unit 33, and the control unit 33 determines the presence or absence of emergency information on the basis of the value of the emergency information flag included in the MCCH. When determining that there is no emergency information from the value of the emergency information flag, the mobile terminal returns to the process of step ST9b.

When, in step ST14b, determining that there is emergency information, the mobile terminal 1 starts receiving the emergency information channel included in the MTCH which is transmitted from the base station 2 in the above-mentioned way according to the emergency information channel information included in the MCCH received in step ST13b (step ST15b).

In a case in which, in step ST15b, the emergency information channel information is determined in advance by the mobile communications system, and both the mobile terminal 1 and the base station 2 in this mobile communications system recognize this information, the mobile terminal 1 starts receiving the emergency information channel included in the MTCH according to this information. As an alternative, in a case in which the emergency information channel information is determined by the base station 2, this base station 2 sets the emergency information channel information as a part of broadcast information and delivers this broadcast information to the mobile terminals 1 existing within the cell thereof and being under the control thereof by using, for example, the P-CCPCH. In this case, each of the mobile terminals 1 can start receiving the emergency information channel included in the MTCH according to the emergency information channel information delivered thereto in advance.

Thus, each of the mobile terminals 1 is constructed in such a way as to, even when placed in an idle state in which it is not receiving any MBMS data, receive the MICH, and, when the indicator of this MICH shows the description of the MBMS receive target including the emergency information channel, starts receiving the MCCH to be able to recognize the presence or absence of emergency information from the value of the emergency information flag. When each of the mobile terminals 1 is not receiving any MBMS data or selects any service, each mobile terminal 1 can monitor the presence or absence of emergency information from a base station 2. Therefore, this embodiment is very effective for notification of emergency information to users through mobile terminals 1.

When starting receiving the emergency information channel, the mobile terminal 1 notifies the user that it has started receiving the emergency information with a sound, vibrations, or a display of characters on the screen thereof (step ST16b). For example, even when the mobile terminal is performing either a phone call or packet communications, the control unit 33 of the mobile terminal makes such a notification as mentioned above of the emergency information by controlling a not-shown audio output unit, vibration mechanism, or display processing unit as the mobile terminal starts receiving the emergency information channel.

As mentioned above, in the mobile communications system according to this Embodiment 3, each base station 2 transmits the MICH to mobile terminals 1 before transmitting the MCCH, and each of the mobile terminals 1 receives the MCCH according to the description of the indicator of the MICH, and then determines the presence or absence of emergency information from the value of the emergency information flag included in the MCCH to receive the emergency information by using the MBMS. Therefore, the mobile communications system can notify the occurrence of emergency information to even a mobile terminal 1 placed in an idle state in which it is not receiving any MBMS data to enable the mobile terminal 1 to receive the emergency information channel included in the MBMS. Furthermore, the mobile communications system can notify the emergency information received via the emergency channel included in the MBMS to the user of the mobile terminal 1 which is communicating individual data.

In above-mentioned Embodiments 2 and 3, as the method of making the indicator included in the MICH show a description including emergency information, a method of, when the emergency information flag included in the MCCH is set to "presence", changing the digital value of the desired indicator for notification of each of MICH frames corresponding to all the services or service groups.

As another method, there is a method of disposing an indicator used for notification of change in the emergency information flag included in the MCCH in each of all the MICH frames. In this case, when the emergency information flag included in the MCCH is set to "presence" in step ST3a or ST3b, the base station 2 changes the digital value of the indicator used for notification of change in the emergency information flag included in the MCCH of each of MICH frames corresponding to all the services or service groups. For example, in a case in which the indicator used for notification of change in the emergency information flag included in the MCCH is 2-bit digital data and is set up in such away that a digital value of 11 shows that there is a change in the MCCH and a digital value of 00 shows that there is no change in the MCCH, the base station changes the indicator for notification from the digital value of 00 to the digital value of 11. The mobile terminal 1, in step ST11a or ST12b, receives an MICH frame corresponding to a service which the mobile terminal desires to receive to determine whether or not there is a change in the MCCH from the desired indicator, and also monitors the indicator used for notification of change in the emergency information flag included in the MCCH, the indicator being included in the same MICH frame, to determine whether or not the emergency information flag included in the MCCH is set to "presence". The indicator used for notification of change in the emergency information flag included in the MCCH can be digital data having the same number of bits as another indicator for notification.

As mentioned above, because the indicator used for notification of change in the emergency information flag included in the MCCH is disposed in each of all the MICH frames, and the mobile terminal receives only the indicator used for notification of change in the emergency information flag included in the MCCH even in a case of not having any service or service group which the mobile terminal desires to receive at normal times (not in case of an emergency), there is provided an advantage of being able to determine whether or not the MCCH emergency information flag in case of an emergency is set to "presence" is acquired. Furthermore, because the indicator used for notification of change in the emergency information flag included in the MCCH is disposed in each of all the MICH frames, the mobile terminal can receive any of the MICH frames and carry out flexible scheduling between the base station and the mobile terminal.

As a further method, there is a method of setting up a service or service group used for the MCCH emergency information channel. In this case, when the emergency information flag included in the MCCH is set to "presence" in step ST3a or ST3b, the base station 2 changes the digital value of the indicator used for notification of change in the emergency information flag included in the MCCH of an MICH frame corresponding to the service or service group used for the MCCH emergency information channel. For example, in a case in which the indicator used for notification of change in the emergency information flag included in the MCCH is 2-bit digital data and is set up in such a way that a digital value of 11 shows that there is a change in the MCCH and a digital value of 00 shows that there is no change in the MCCH, the base station changes the indicator for notification from the digital value of 00 to the digital value of 11. The mobile terminal 1, in step ST11a or ST12b, determines whether or not the emergency information flag included in the MCCH is set to "presence" from the indicator used for notification of change in the emergency information flag included in the MCCH, the indicator being included in the MICH frame corresponding to the service or service group used for the MCCH emergency information channel. The indicator used for notification of change in the emergency information flag included in the MCCH can be digital data having the same number of bits as another indicator for notification of a service or service group.

As mentioned above, because the service or service group used for the MCCH emergency information channel is set up in advance, and the mobile terminal receives only an MICH frame corresponding to the service or service group used for the emergency information channel included in the MCCH even in a case of not having any service or service group which the mobile terminal desires to receive at normal times (not in case of an emergency), there is provided an advantage of being able to enable the mobile terminal to determine whether or not the MCCH emergency information flag included in the frame in case of an emergency is set to "presence".

In above-mentioned Embodiments 2 and 3, a case in which a mobile terminal is placed in either a state (CELL_DCH state) in which it is communicating individual data or an idle state (Idle state) is disclosed, though the method of disposing the emergency information flag in the MCCH, and enabling the mobile terminal to receive the MICH, receive the MCCH according to the description of the indicator to determine the presence or absence of emergency information from the value of the emergency information flag included in the MCCH, and receive the emergency information by using an MBMS can be applied not only to the above-mentioned states, but also to a CELL_FACH state, a CELL_PCH state, and a URA_PCH state. Therefore, the mobile communications system enables each mobile terminal to receive the emergency information data regardless of in which state each mobile terminal is placed, and to receive the emergency information data included in the MEMS at an earlier time without receiving any other unnecessary information and without causing the user to perform an operation of selecting the emergency information channel when receiving the emergency information, thereby sufficiently ensuring the immediacy of the emergency information.

In above-mentioned Embodiments 2 and 3, the method of making each mobile terminal receive the MICH and receive the MCCH according to the description of the indicator is disclosed. Instead of the MICH, a PICH can be used. Concretely, an indicator used for notification of change in the emergency information flag included in the MCCH can be disposed in each of all PICH frames. In this case, when, in step ST3a or ST3b, the emergency information flag included in the MCCH is set to "presence", the base station 2 changes the digital value of the indicator used for notification of change in the emergency information flag included in the MCCH of each of PICH frames corresponding to all the mobile terminals or mobile terminal groups. For example, in a case in which the indicator used for notification of change in the emergency information flag included in the MCCH is 2-bit digital data and is set up in such a way that a digital value of 11 shows that there is a change in the MCCH and a digital value of 00 shows that there is no change in the MCCH, the base station changes the indicator for notification from the digital value of 00 to the digital value of 11. Each mobile terminal 1, in step ST11a or ST12b, receives a PICH frame corresponding thereto, and monitors the indicator used for notification of change in the emergency information flag included in the MCCH which is included in the PICH frame to determine whether or not the emergency information flag included in the MCCH is set to "presence". The indicator used for notification of change in the emergency information flag included in the MCCH can be digital data having the same number of bits as another indicator (a paging indicator) in the PICH frame. When, in step ST11a or ST12b, determining that the emergency information flag included in the MCCH is set to "presence", each mobile terminal immediately makes a transition to an operation of receiving the MCCH in step ST12a or ST13b.

As another method, there can be a method of setting up a PICH frame used for the MCCH emergency information channel. In this case, when, in step ST3a or ST3b, the emergency information flag included in the MCCH is set to "presence", the base station 2 changes the digital value of the indicator used for notification of change in the emergency information flag included in the MCCH of the PICH frame used for the MCCH emergency information channel. For example, in a case in which the indicator used for notification of change in the emergency information flag included in the MCCH is 2-bit digital data and is set up in such a way that a digital value of 11 shows that there is a change in the MCCH and a digital value of 00 shows that there is no change in the MCCH, the base station changes the indicator for notification from the digital value of 00 to the digital value of 11. Each mobile terminal 1, in step ST11a or ST12b, determines whether or not the emergency information flag included in the MCCH is set to "presence" from the indicator used for notification of change in the emergency information flag included in the MCCH, the indicator being included in the PICH frame used for the MCCH emergency information channel. When, in step ST11a or ST12b, determining that the emergency information flag included in the MCCH is set to "presence", each mobile terminal immediately makes a transition to an operation of receiving the MCCH in step ST12a or ST13b.

Each mobile terminal typically receives the PICH when placed in an idle state (Idle state). Each mobile terminal can be made to receive the PICH when placed not only in the idle state, but also in a CELL_DCH state, a CELL_FACH state, a CELL_PCH state, and a URA_PCH state. Therefore, the mobile communications system enables each mobile terminal to receive the emergency information data regardless of in which state each mobile terminal is placed, and to receive the emergency information data included in the MBMS quickly without receiving any other unnecessary information, such as a BCCH, and without causing the user to perform an operation of selecting the emergency information channel when receiving the emergency information, thereby sufficiently ensuring the immediacy of the emergency information.

In above-mentioned Embodiments 1 to 3, each base station 2 determines whether or not multimedia data received from a base station control apparatus 3 have emergency information, and, when determining that there is emergency information, sets a digital value showing "presence" to the emergency information flag included in the MCCH which is transmitted via the S-CCPCH used for transmission of multimedia data which are the emergency information, adds information (emergency information channel information) required for mobile terminals 1 to receive the emergency information channel to the MCCH, and maps the emergency information to the emergency information channel included in the MTCH. As an alternative, base station control apparatuses 3 can perform these processes.

A concrete example will be shown. A base station control apparatus 3 to which multimedia data are transmitted from the SGSN 4, in step ST1, ST2a, or ST2b, determines whether or not there is emergency information. For example, a radio resource control unit 53 of the base station control apparatus 3 determines the presence or absence of emergency information by determining whether or not the base station control apparatus has received multimedia data which are emergency information. When determining that there is no emergency information, the base station control apparatus 3 makes a transition to the process of step ST4, ST5*a*, or ST5*b*. In contrast, when determining that there is emergency information, the radio resource control unit 53 of the base station control apparatus 3 sets a digital value showing "presence" to the emergency information flag included in the MCCH which is transmitted via the S-CCPCH used for transmission of the multimedia data which are emergency information (step ST2, ST3*a*, or ST3*b*). For example, in a case in which the emergency information flag is 1-bit digital data and is set up in such a way that a digital value of 1 shows that there is emergency information and a digital value of 0 shows that there is no emergency information, the radio resource control unit 53 changes the emergency information flag from the digital value of 0 to the digital value of 1.

Next, the base station control apparatus 3 adds the emergency information channel information to the MCCH (step ST3, ST4*a*, or ST4*b*). In this case, as the emergency information channel information, for example, the emergency information channel number can be considered. This emergency information channel information is added by the radio resource control unit 53. In a case in which the emergency information channel information is determined in advance by the mobile communications system, and both the mobile terminal 1 and the base station control apparatus 3 in this mobile communications system recognize this information, the base station control apparatus 3 does not need to deliver this information to the mobile terminal 1 via the base station 2. In this case, steps ST3, ST4*a*, and ST4*b* can be omitted. By thus omitting this step, the processing load on the base station control apparatus 3 can be reduced, and the radio resources can be used effectively for the other processes. Furthermore, in a case in which the emergency information channel information is determined by the base station control apparatus 3, step ST3 can be omitted when this the base station control apparatus 3 delivers, via the base station 2, the emergency information channel information to mobile terminals 1 existing within the cell of the base station 2 and being under the control of the base station 2 in advance. For example, a broadcast information transmitting unit 34 of the base station 2 sets this information as a part of broadcast information and delivers the broadcast information to the mobile terminals in advance by using a P-CCPCH. Also by doing in this way, the processing load on the base station control apparatus 3 can be reduced, and the radio resources can be used effectively for the other processes.

When, in step ST1, ST2*a*, or ST2*b*, determining that there is no emergency information, or when the process of step ST3, ST4*a*, or ST4*b* is completed, the base station control apparatus 3 transmits, via the base station 2, the MCCH to the mobile terminals 1 being under the control of the base station 2 (step ST4, ST6*a*, or ST6*b*). In contrast, when there is emergency information, the radio resource control unit 53 of the base station control apparatus 3 maps the emergency information to the emergency information channel included in the MTCH (step ST5, ST7*a*, or ST7*b*). After that, the base station control apparatus 3 causes the base station 2 to transmit the MTCH to the mobile terminals 1 being under the control thereof which receive the MBMS within the cell thereof via the antenna 42 by making the base station 2 perform the above-mentioned transmitting process (step ST6, ST8*a*, or ST8*b*). The order of these processes can be arbitrary, or these processes can be carried out simultaneously.

As mentioned above, each base station control apparatus 3 is constructed in such a way as to determine whether or not received multimedia data have emergency information, and, when determining that the received multimedia data have emergency information, set a digital value showing "presence" to the emergency information flag included in the MCCH which is transmitted via the S-CCPCH used for transmission of the multimedia data which are the emergency information, and then perform the process of adding the information (emergency information channel information) required for mobile terminals 1 to receive the emergency information channel into the MCCH. Therefore, the present embodiment offers an advantage of being able to enable each of a plurality of base stations 2 to transmit so-called wide area emergency information having the same description without carrying out the above-mentioned processes, thereby enabling a mobile terminal staying at an end of a cell to combine the received powers from the above-mentioned plurality of base stations 2. As a result, the quality of reception of the emergency information of the mobile terminal can be improved, and the emergency information can be transmitted correctly and quickly to the mobile terminal.

Embodiment 4

A mobile communications system in accordance with this Embodiment 4 notifies the occurrence of emergency information to even a mobile terminal which is receiving individual data which are not emergency information by using an emergency information flag disposed in a BCCH so as to enable the mobile terminal to receive an emergency information channel included in an MBMS.

Although the fundamental structures of each mobile terminal, each base station, and each base station control apparatus which are disposed in the mobile communications system in accordance with Embodiment 4 are the same as those according to above-mentioned Embodiment 1 shown in FIGS. 1 to 5, they differ from those of Embodiment 1 in that the emergency information flag (emergency information indicator) showing the presence or absence of emergency information is disposed in the BCCH which is a broadcast control channel, and, when emergency information occurs, each base station transmits the BCCH to mobile terminals, and mobile terminals each of which is receiving individual data which is not emergency information determines the presence or absence of emergency information from the value of the emergency information flag included in the BCCH and then receives the emergency information by using an MBMS. Hereinafter, the structure of the mobile communications system in accordance with this Embodiment 4 will be explained similarly with reference to FIGS. 1 to 5.

Next, the operation of the mobile communications system will be explained.

Figure 9:
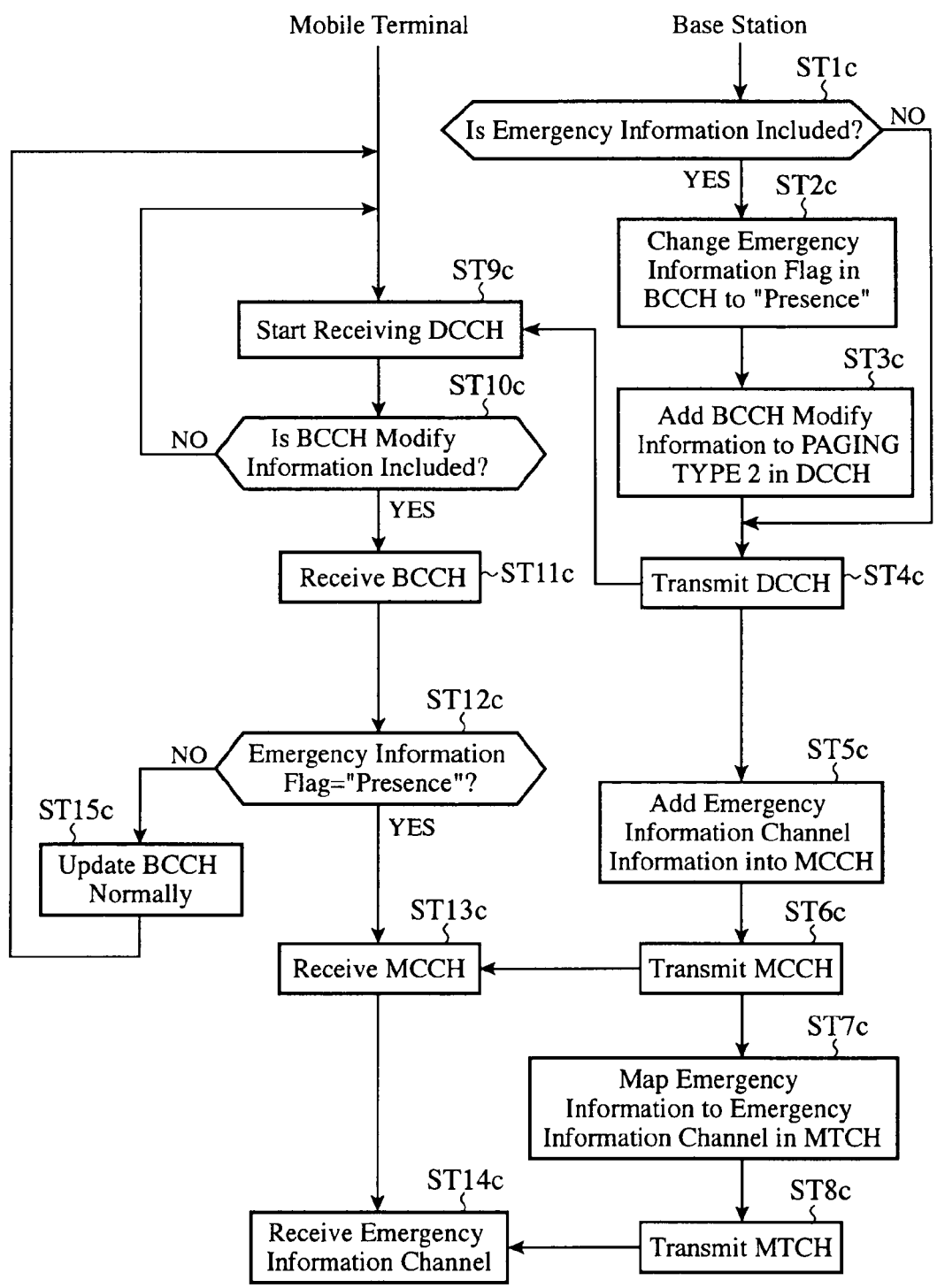
FIG. 9 is a flow chart showing a notification process of notifying emergency information which is carried out by a mobile communications system in accordance with Embodiment 4.

FIG. 9 is a flow chart showing a notification process of notifying emergency information which is carried out by the mobile communications system in accordance with Embodiment 4, and the details of the operation will be explained with reference to this figure. In Embodiment 4, a case in which a base station 2 which is transmitting individual data which are not emergency information to a mobile terminal 1 notifies emergency information to this mobile terminal 1 will be described.

First, a content provider transmits multimedia data to be transmitted to the mobile terminal 1 to a service center 6. The service center 6 stores the multimedia data in its internal memory, and also transfers the multimedia data to an SGSN 4 which manages the mobile terminal 1 using this multimedia service via a GGSN 5. The SGSN 4 transmits the multimedia data to the base station 2 via a base station control apparatus 3.

Next, the base station 2 determines whether or not the multimedia data received from the base station control apparatus 3 have emergency information (step ST1*c*), like that of above-mentioned Embodiment 1. For example, a downlink shared channel transmitting unit 36 of the base station 2 determines the presence or absence of emergency information by determining whether or not it has received multimedia data which are emergency information. The multimedia data which are emergency information transmitted to the base station 2 can be either so-called wide area emergency information having the same description among a large number of base stations 2, or so-called local emergency information limited to a local area and having the same description in only one base station 2 or among a small number of base stations 2.

When, in step ST1c, determining that there is no emergency information, the base station shifts to a process of step ST4c. In contrast, when determining that there is emergency information, the downlink shared channel transmitting unit 36 of the base station 2 sets a digital value showing "presence" to the emergency information flag included in the BCCH to be transmitted via an S-CCPCH used for transmission of the multimedia data which are emergency information (step ST2c). For example, in a case in which the emergency information flag is one bit of digital data, and is defined in such a way that a digital value of 1 shows the presence of emergency information and a digital value of 0 shows the absence of emergency information, the downlink shared channel transmitting unit 36 changes the value of the emergency information flag from the digital value of 0 to the digital value of 1.

Next, the base station 2 adds BCCH Modify information to PAGING TYPE 2 included in a DCCH (step ST3c). When the description of the BCCH is changed, the BCCH Modify information shows the description of the change. This information is added by either a downlink dedicated channel transmitting unit 35 or the downlink shared channel transmitting unit 36.

The base station 2 then transmits the DCCH to mobile terminals 1 being under the control thereof (step ST4c). After that, the base station 2 adds information (emergency information channel information) required for the mobile terminal 1 to receive the emergency information channel to an MCCH (step ST5c). As the emergency information channel information, for example, the emergency information channel number can be considered, like in the case of above-mentioned Embodiment 1. This emergency information channel information is added to the MCCH by the downlink shared channel transmitting unit 36.

In a case in which the emergency information channel information is determined in advance by the mobile communications system, and both the mobile terminal 1 and the base station 2 in this mobile communications system recognize this information, the base station 2 does not need to deliver this information to the mobile terminal 1. In this case, step ST5c can be omitted. By thus omitting this step, the processing load on the base station 2 can be reduced, and the radio resources can be used effectively for the other processes.

As an alternative, in a case in which the emergency information channel information is determined by the base station 2, step ST5c can be omitted when this base station 2 delivers the emergency information channel information to mobile terminals 1 being under the control thereof in advance. For example, a broadcast information transmitting unit 34 of the base station 2 sets this information as a part of broadcast information and delivers the broadcast information to the mobile terminal in advance by using a P-CCPCH. Also by doing in this way, the processing load on the base station 2 can be reduced, and the radio resources can be used effectively for the other processes.

Next, the base station 2 transmits the MCCH to the mobile terminals 1 being under the control thereof (step ST6c). When determining that there is emergency information, the downlink shared channel transmitting unit 36 of the base station 2 maps the emergency information received via the base station control apparatus 3 to the emergency information channel included in the MTCH (step ST7c). After that, the base station 2 transmits the MTCH to the mobile terminals 1 being under the control thereof which receive the MBMS within the cell thereof via an antenna 42 by carrying out the above-mentioned transmitting process (step ST8c). The order of the processes of steps ST2c to ST7c can be arbitrary, or the processes can be carried out simultaneously.

The mobile terminal 1 receives the DCCH which is transmitted from the base station 2 in the above-mentioned way (step ST9c), and determines the presence or absence of BCCH Modify information in PAGING TYPE 2 included in this DCCH (step ST10c). For example, the description of the DCCH received by the mobile terminal 1 is informed to a control unit 33, and the control unit 33 analyzes the description of PAGING TYPE 2 included in the DCCH so as to determine the presence or absence of BCCH Modify information. In this case, when determining that there is no BCCH Modify information in PAGING TYPE 2, the mobile terminal returns to the process of step ST9c.

In contrast, when, in step ST10c, determining that there is BCCH Modify information in PAGING TYPE 2, the mobile terminal 1 receives the BCCH from the base station 2 (step ST11c), and then determines the presence or absence of emergency information from the value of the emergency information flag included in this BCCH (step ST12c). For example, the description of the BCCH received by the mobile terminal 1 is informed to the control unit 33, and the control unit 33 determines the presence or absence of emergency information on the basis of the value of the emergency information flag included in the BCCH. When determining that there is no emergency information from the value of the emergency information flag, the mobile terminal 1 makes a transition to a process of step ST15c and, after performing a general BCCH update process, returns to the process of step ST9c.

When, in step ST12c, determining that there is emergency information, the mobile terminal 1 receives the MCCH which is transmitted from the base station 2 in the above-mentioned way (step ST13c), and starts receiving the emergency information channel included in the MTCH which is transmitted from the base station 2 according to the emergency information channel information included in the MCCH (step ST14c).

In a case in which, in step ST14c, the emergency information channel information is determined in advance by the mobile communications system, and both the mobile terminal 1 and the base station 2 in this mobile communications system recognize this information, the mobile terminal 1 starts receiving the emergency information channel included in the MTCH according to this information.

As an alternative, in a case in which the emergency information channel information is determined by the base station 2, this base station 2 sets the emergency information channel information as a part of broadcast information and delivers this broadcast information in advance to the mobile terminals 1 existing within the cell thereof and being under the control thereof by using, for example, the P-CCPCH. In this case, each of the mobile terminals 1 can start receiving the emergency information channel included in the MTCH according to the emergency information channel information delivered thereto in advance.

As mentioned above, according to this Embodiment 4, because the emergency information flag (emergency information indicator) showing the presence or absence of emergency information is disposed in the BCCH, the mobile communications system can notify the occurrence of emergency information to even a mobile terminal 1 which is receiving individual data which are not emergency information via the BCCH so as to enable the mobile terminal to receive the emergency information channel included in the MBMS. Furthermore, unlike in a case in which the emergency information flag is disposed in the MCCH which only a mobile terminal 1 which supports the MEMS can receive, because even a mobile terminal 1 which does not support the MBMS can receive the BCCH, the base station 2 can notify the presence or absence of emergency information to all the mobile terminals 1 existing within the cell thereof.

In the emergency information notifying system disclosed by patent reference 1, in addition to information showing the presence or absence of emergency information, emergency information channel information required in order to receive the emergency information channel is transmitted as, for example, broadcast information on the BCCH, the amount of information of the broadcast information increases and there is a possibility that there is a necessity to reduce other information to be delivered as broadcast information.

In contrast with this, because the mobile communications system in accordance with this Embodiment 4 is constructed in such a way that only the emergency information flag (emergency information indicator) showing the presence or absence of emergency information is disposed in the BCCH, a minimum amount of information is required in order to notify the presence or absence of emergency information, and there is no necessity to reduce any other information included in the BCCH. Furthermore, the mobile communications system enables each mobile terminal 1 to receive the emergency information data included in the MBMS at an earlier time without receiving, via the BCCH, any other information unnecessary for reception of the emergency information, thereby sufficiently ensuring the immediacy of the emergency information.

Embodiment 5

A mobile communications system in accordance with the present Embodiment 5 is constructed in such a way as to notify the occurrence of emergency information to even a mobile terminal placed in an idle state in which it is not receiving any MBMS data by using an emergency information flag disposed in a BCCH to enable the mobile terminal to receive an emergency information channel included in an MBMS.

Although the fundamental structures of each mobile terminal, each base station, and each base station control apparatus which are disposed in the mobile communications system in accordance with Embodiment 5 are the same as those according to above-mentioned Embodiment 1 shown in FIGS. 1 to 5, they differ from those of Embodiment 1 in that the emergency information flag (an emergency information indicator) showing the presence or absence of emergency information is disposed in the BCCH which is a broadcast control channel, and, when emergency information occurs, each base station transmits the BCCH to mobile terminals and a mobile terminal placed in an idle state in which it is not receiving any MBMS data determines the presence or absence of emergency information from the value of the emergency information flag included in the BCCH and receives the emergency information by using an MBMS. Hereinafter, the structure of the mobile communications system in accordance with this Embodiment 5 will be explained similarly with reference to FIGS. 1 to 5.

Next, the operation of the mobile communications system will be explained.

Figure 10:
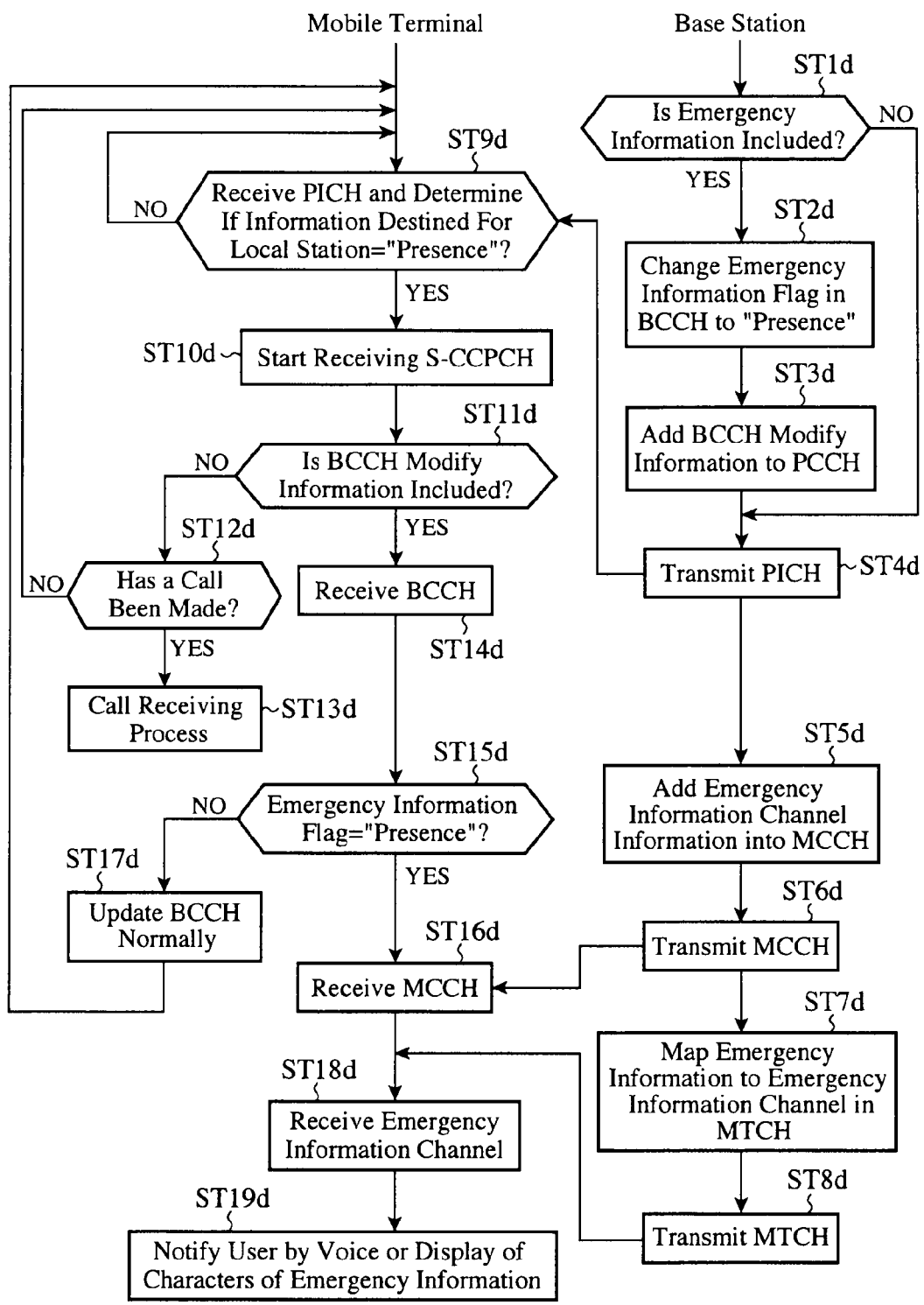
FIG. 10 is a flowchart showing a notification process of notifying emergency information which is carried out by a mobile communications system in accordance with Embodiment 5.
Figure 11:
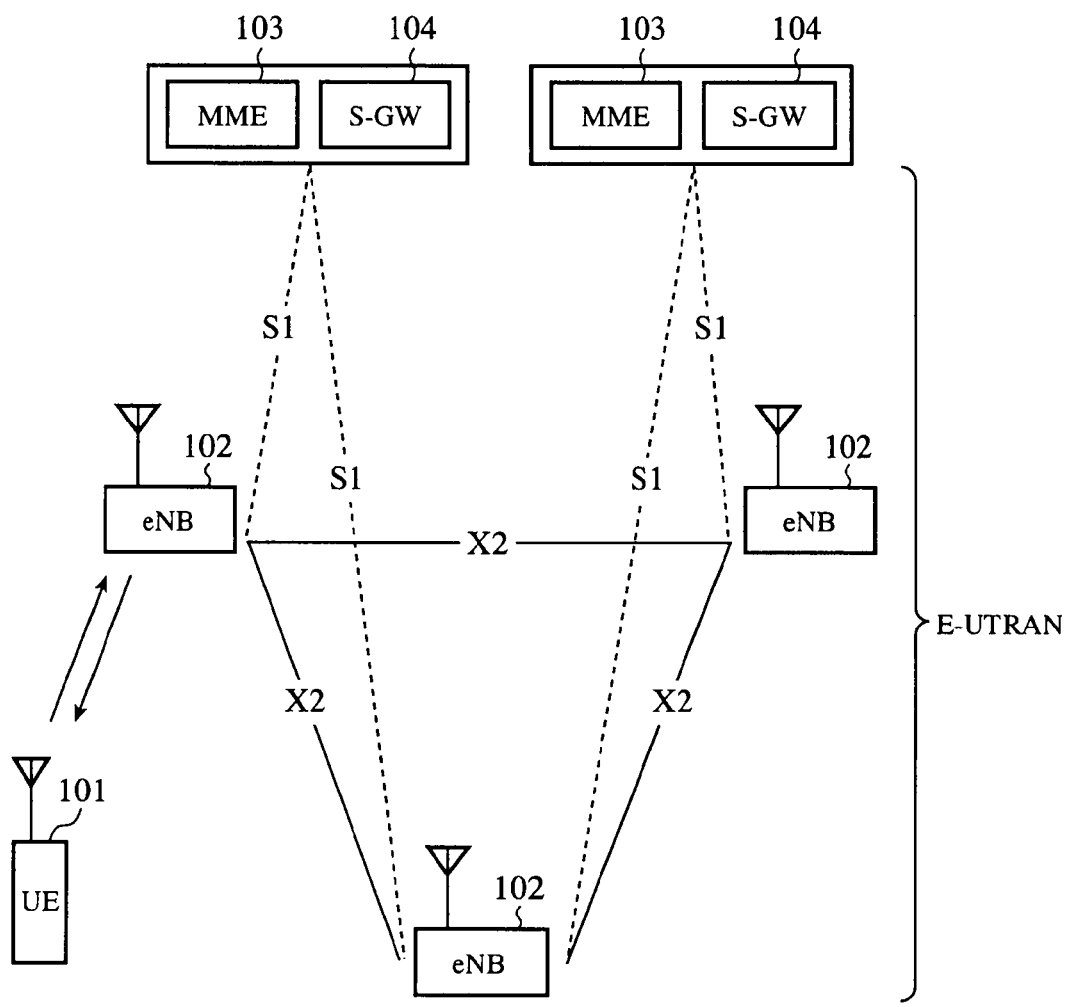
FIG. 11 is an explanatory drawing showing the structure of a communications system according to an LTE method, and shows an explanatory drawing showing the structure of a communications system according to an LTE method.
Figure 12:
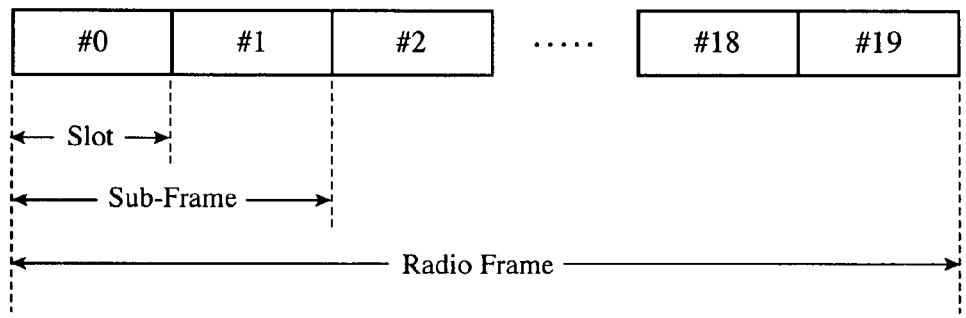
FIG. 12 is an explanatory drawing showing the structure of a radio frame for use in a communications system according to an LTE method.
Figure 13:
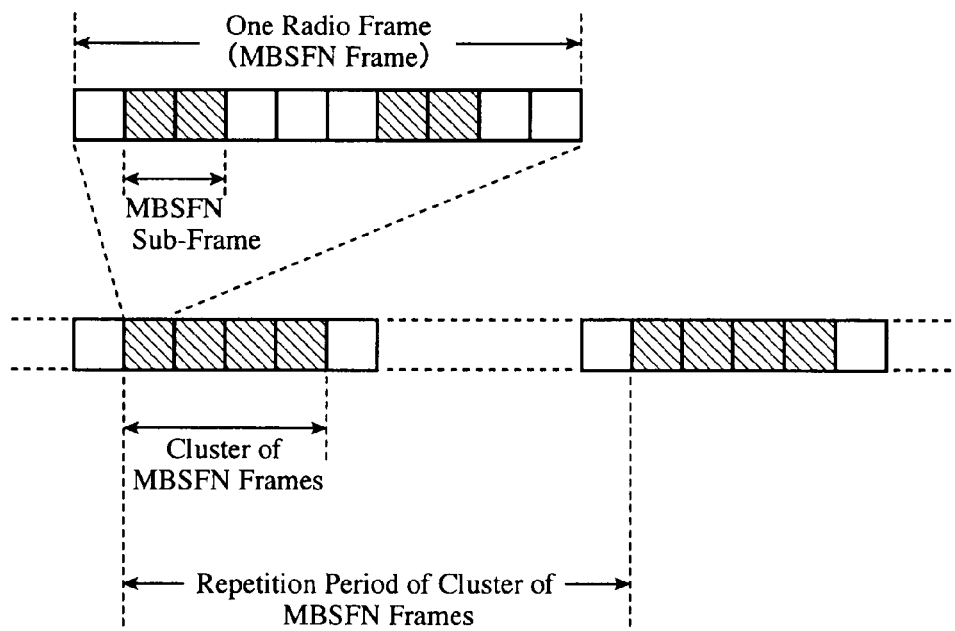
FIG. 13 is an explanatory drawing showing the structure of an MBSFN (Multimedia Broadcast multicast service Single Frequency Network) frame.
Figure 14:
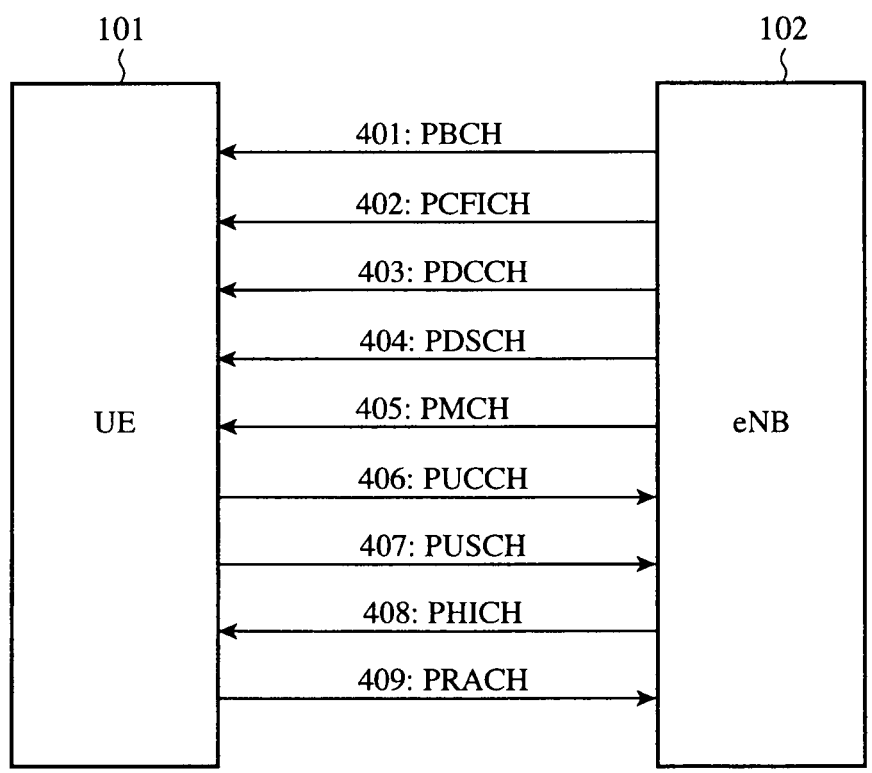
FIG. 14 is an explanatory drawing explaining physical channels for use in a communications system according to an LTE method.
Figure 16:
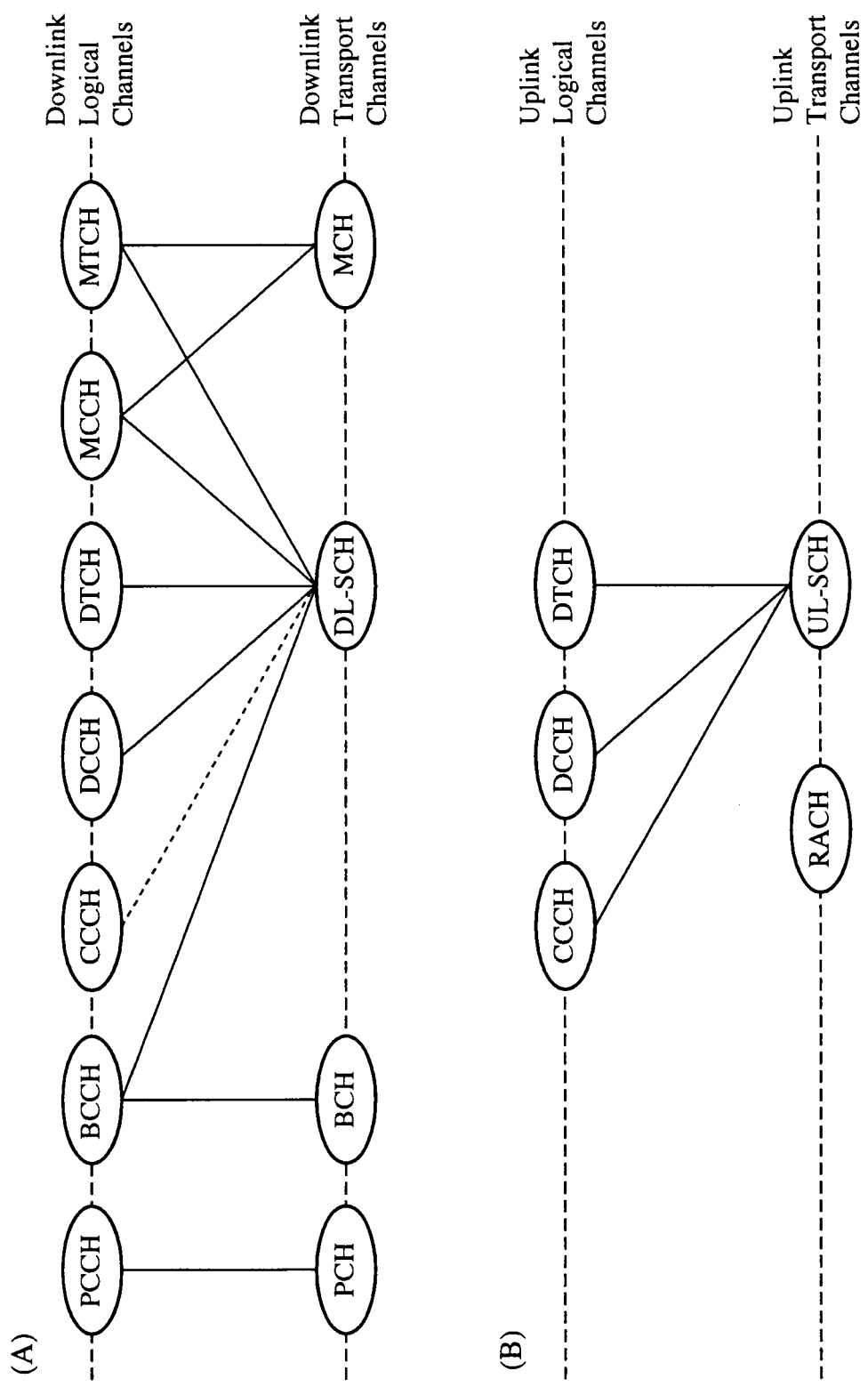
FIG. 16 is an explanatory drawing explaining logical channels for use in a communications system according to an LTE method.
Figure 17:
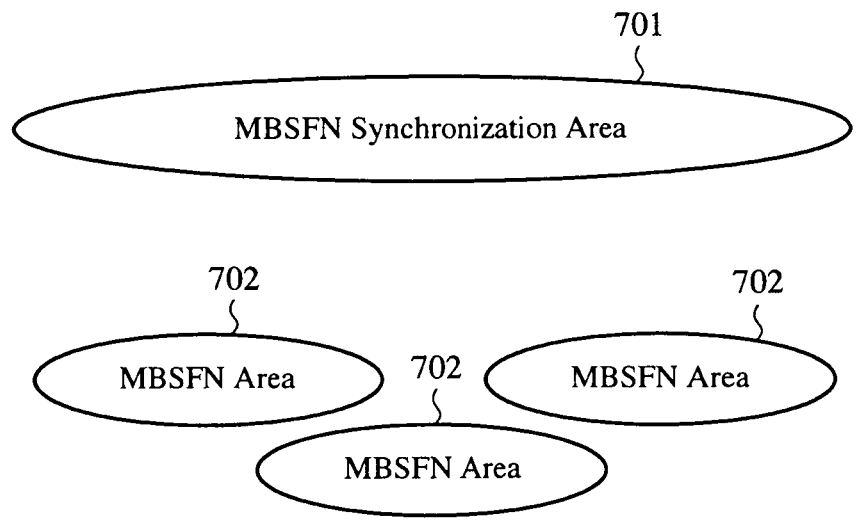
FIG. 17 is an explanatory drawing explaining a relation between an MBSFN synchronization area and an MBSFN area.
Figure 18:
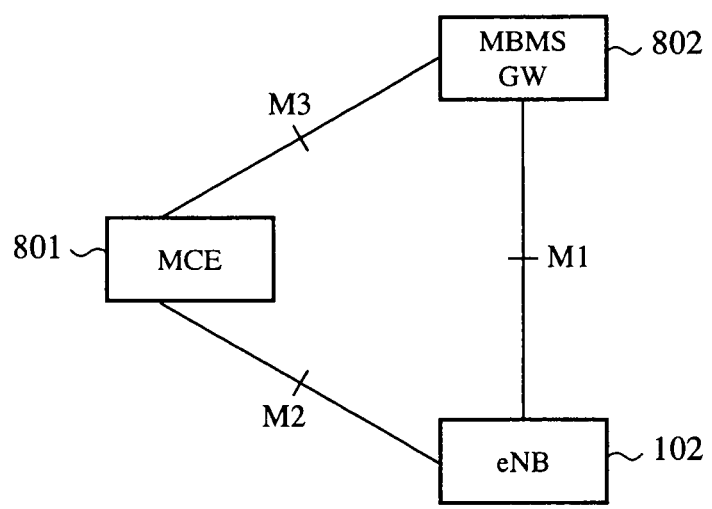
FIG. 18 is an explanatory drawing explaining the logical architecture (Logical Architecture) of an E-MEMS.
Figure 19:
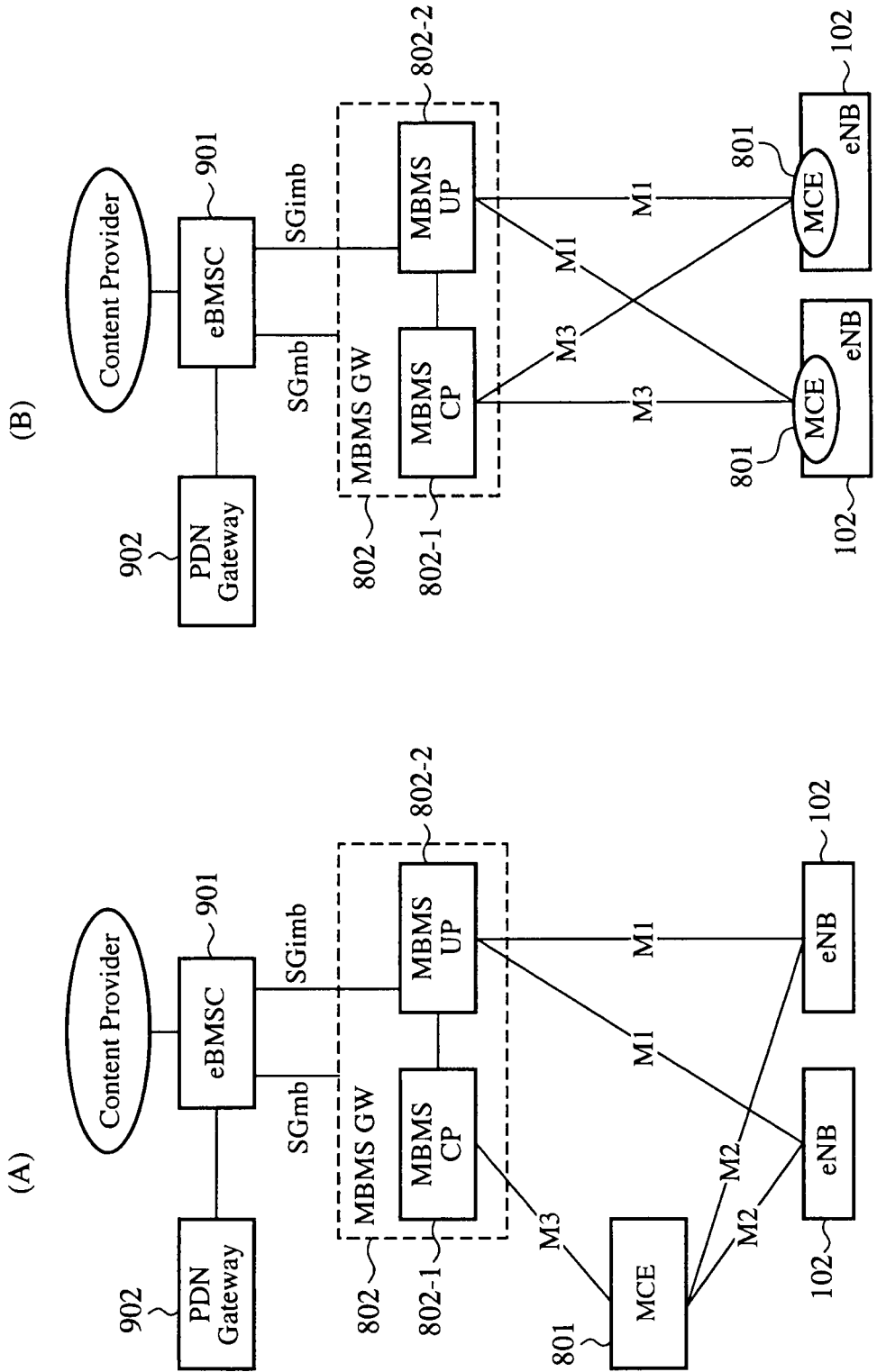
FIG. 19 is an explanatory drawing explaining the architecture (Architecture) of the E-MBMS.

FIG. 10 is a flow chart showing a notification process of notifying emergency information which is carried out by the mobile communications system in accordance with Embodiment 5, and the details of the operation will be explained with reference to this figure. In Embodiment 5, a case in which a base station notifies emergency information to a mobile terminal 1 placed in an idle state in which it is not receiving any MBMS data will be described.

First, a base station 2 transmits a PICH to mobile terminals 1 existing within the cell thereof and being under the control thereof cyclically and a mobile terminal 1 is placed in an idle state until it receives information destined therefor via the PICH. At this time, a content provider transmits multimedia data to be transmitted to the mobile terminals 1 to a service center 6. The service center 6 stores the multimedia data in its internal memory, and also transfers the multimedia data to an SGSN 4 which manages the mobile terminal 1 using this multimedia service via a GGSN 5. The SGSN 4 transmits the multimedia data to the base station 2 via a base station control apparatus 3.

Next, the base station 2 determines whether or not the multimedia data received from the base station control apparatus 3 have emergency information (step ST1$d$), like that of above-mentioned Embodiment 1. For example, a downlink shared channel transmitting unit 36 of the base station 2 determines the presence or absence of emergency information by determining whether or not it has received multimedia data which are emergency information. The multimedia data which are emergency information transmitted to the base station 2 can be either so-called wide area emergency information having the same description among a large number of base stations 2, or so-called local emergency information limited to a local area and having the same description in only the base station 2 or among a small number of base stations 2.

When, in step ST1$d$, determining that there is no emergency information, the base station shifts to a process of step ST4$d$. In contrast, when determining that there is emergency information, the downlink shared channel transmitting unit 36 of the base station 2 sets a digital value showing "presence" to the emergency information flag included in the BCCH to be transmitted via an S-CCPCH used for transmission of the multimedia data which are emergency information (step ST2$d$). For example, in a case in which the emergency information flag is one bit of digital data, and is defined in such a way that a digital value of 1 shows the presence of emergency information and a digital value of 0 shows the absence of emergency information, the downlink shared channel transmitting unit 36 changes the value of the emergency information flag from the digital value of 0 to the digital value of 1.

Next, the base station 2 adds BCCH Modify information to a PCCH (step ST3$d$). When the description of the BCCH is changed, the BCCH Modify information shows the description of the change, as shown in above-mentioned Embodiment 4. This information is added by the downlink shared channel transmitting unit 36.

The base station 2 then transmits the PICH to the mobile terminals 1 existing within the cell thereof and being under the control thereof (step ST4$d$). After that, the base station 2 adds information (emergency information channel information) required for the mobile terminals 1 to receive the emergency information channel to an MCCH (step ST5$d$). As the emergency information channel information, for example, the emergency information channel number can be considered, like in the case of above-mentioned Embodiment 1. This emergency information channel information is added to the MCCH by the downlink shared channel transmitting unit 36.

In a case in which the emergency information channel information is determined in advance by the mobile communications system, and both the mobile terminal 1 and the base station 2 in this mobile communications system recognize this information, the base station 2 does not need to deliver this information to the mobile terminal 1. In this case, step ST5*d* can be omitted. By thus omitting this step, the processing load on the base station 2 can be reduced, and the radio resources can be used effectively for the other processes.

Furthermore, in a case in which the emergency information channel information is determined by the base station 2, step ST5*d* can be omitted when this base station 2 delivers the emergency information channel information to the mobile terminals 1 existing within the cell thereof and being under the control thereof in advance. For example, a broadcast information transmitting unit 34 of the base station 2 sets this information as a part of broadcast information and delivers the broadcast information to the mobile terminals in advance by using a P-CCPCH. Also by doing in this way, the processing load on the base station 2 can be reduced, and the radio resources can be used effectively for the other processes.

Next, the base station 2 transmits the MCCH to the mobile terminals 1 being under the control thereof (step ST6*d*). When determining that there is emergency information, the downlink shared channel transmitting unit 36 of the base station 2 maps the emergency information received via a base station control apparatus 3 to the emergency information channel included in the MTCH (step ST7*d*). After that, the base station 2 transmits the MTCH to the mobile terminals 1 being under the control thereof which receive an MBMS within the cell thereof via an antenna 42 by carrying out the above-mentioned transmitting process (step ST8*d*). The order of the processes of steps ST2*d* to ST7*d* can be arbitrary, or the processes can be carried out simultaneously.

In step ST9*d*, the mobile terminal 1 receives the PICH from the base station 2 to determine the presence or absence of information (PI; Paging Indicator) destined for the mobile terminal 1. For example, the description of the PICH received by the mobile terminal 1 is informed to a control unit 33, and the control unit 33 determines the presence or absence of the information destined for the local station from the PICH. At this time, when determining that there is no information destined for the local station, the mobile terminal 1 returns to the process of step ST9*d* and then repeats the reception of the PICH cyclically.

In contrast, when determining that there is information destined for the local station, the mobile terminal 1 starts receiving the S-CCPCH from the base station 2 on the basis of this information destined for the local station (step ST10*d*), and determines the presence or absence of BCCH Modify information in the PCCH transmitted thereto via the S-CCPCH (step ST11*d*). For example, the description of the PCCH received by the mobile terminal 1 is informed to the control unit 33, and the control unit 33 analyzes the PCCH so as to determine the presence or absence of BCCH Modify information. At this time, when there is no BCCH Modify information, the mobile terminal 1 determines whether or not a call has been made (step ST12*d*). In this case, when no call has been made, the mobile terminal returns to the process of step ST9*d*, whereas when a call has been made, the mobile terminal performs a process of receiving the call to start audio or data communications (step ST13*d*).

Furthermore, when, in step ST11*d*, determining that there is BCCH Modify information in the PCCH, the mobile terminal 1 receives the BCCH from the base station 2 (step ST14*d*), and determines the presence or absence of emergency information from the value of the emergency information flag included in this BCCH (step ST15*d*). For example, the description of the BCCH received by the mobile terminal 1 is informed to the control unit 33, and the control unit 33 determines the presence or absence of emergency information on the basis of the value of the emergency information flag included in the BCCH. As this time, when determining that there is no emergency information from the value of the emergency information flag, the mobile terminals 1 makes a transition to a process of step ST17*d* and, after performing a general BCCH update process, returns to the process of step ST9*d*.

When, in step ST15*d*, determining that there is emergency information, the mobile terminal 1 receives the MCCH which is transmitted from the base station 2 in the above-mentioned way (step ST16*d*), and starts receiving the emergency information channel included in the MTCH which is transmitted from the base station 2 according to the emergency information channel information included in the MCCH (step ST18*d*).

In a case in which, in step ST18*d*, the emergency information channel information is determined in advance by the mobile communications system, and both the mobile terminal 1 and the base station 2 in this mobile communications system recognize this information, the mobile terminal 1 starts receiving the emergency information channel included in the MTCH according to this information. Furthermore, in a case in which the emergency information channel information is determined by the base station 2, this base station 2 sets the emergency information channel information as a part of broadcast information and delivers this broadcast information in advance to the mobile terminals 1 existing within the cell thereof and being under the control thereof by using, for example, the P-CCPCH. In this case, each of the mobile terminals 1 can start receiving the emergency information channel included in the MTCH according to the emergency information channel information delivered thereto in advance.

When starting receiving the emergency information channel, the mobile terminal 1 notifies the user that it has started receiving the emergency information with a sound, vibrations, or a display of characters on the screen thereof (step ST19*d*). For example, even when the mobile terminal is performing either a phone call or packet communications, the control unit 33 makes such a notification as mentioned above of emergency information by controlling a not-shown audio output unit, vibration mechanism, or display processing unit as the mobile terminal starts receiving the emergency information channel.

In above-mentioned Embodiment 5, the case in which the mobile terminal is placed in an idle state (Idle state) is shown, though this method can also be applied to a CELL_PCH state and a URA_PCH state because the method uses the PICH.

As mentioned above, because the emergency information flag (emergency information indicator) showing the presence or absence of emergency information is disposed in the BCCH according to this Embodiment 5, the mobile communications system can notify the occurrence of emergency information to even a mobile terminal placed in an idle state in which it is not receiving any MBMS data via the BCCH to enable the mobile terminal to receive an emergency information channel included in an MBMS. Like in the case of above-mentioned Embodiment 4, because even a mobile terminal 1 which does not support the MBMS can receive the BCCH, each base station 2 can notify the presence or absence of emergency information to all the mobile terminals 1 existing within the cell thereof.

In above-mentioned Embodiments 4 and 5, each base station 2 adds information (emergency information channel information) required for mobile terminals 1 to receive the emergency information channel to the MCCH, and then maps emergency information to the emergency information channel included in the MTCH. Each base station control apparatus 3 can alternatively carry out these processes. Also in this case, the present embodiment offers an advantage of being able to enable each of a plurality of base stations 2 to transmit so-called wide area emergency information having the same description without carrying out the above-mentioned processes, thereby enabling a mobile terminal existing at an end of a cell to combine the received powers from the above-mentioned plurality of base stations 2. As a result, the quality of reception of the emergency information of the mobile terminal can be improved, and the emergency information can be transmitted correctly and quickly to the mobile terminal.

In above-mentioned Embodiment 4, information (BCCH Modify information) showing that the description of the BCCH has been changed is added to PAGING TYPE2 included in the DCCH, whereas in above-mentioned Embodiment 5, information (BCCH Modify information) showing that the description of the BCCH has been changed is added to PAGING TYPE1 included in the PCCH. As an alternative, in addition to the information showing that the description of the BCCH has been changed, either information showing that there is emergency information or emergency information can be added.

As the information showing that there is emergency information, information showing that emergency information is included in the MCCH or/and information showing that emergency information is included in the BCCH can be provided.

By providing such the information, each mobile terminal can determine the presence or absence of the emergency information quickly, and the control delay caused by the notification of the emergency information can be reduced. Therefore, there is provided an advantage of being able to reduce the time required for each mobile terminal to receive the emergency information.

Furthermore, in above-mentioned Embodiment 4, information (BCCH Modify information) showing that the description of the BCCH has been changed is added to PAGING TYPE2 included in the DCCH, whereas in above-mentioned Embodiment 5, information (BCCH Modify information) showing that the description of the BCCH has been changed is added to PAGING TYPE1 included in the PCCH, though instead of the information showing that the description of the BCCH has been changed, information showing that the description of the MCCH has been changed can be added.

By adding this information, each mobile terminal can receive the MCCH immediately without receiving the BCCH, and can therefore receive the emergency information channel according to the information regarding the emergency information channel included in the MCCH. Therefore, each mobile terminal can determine the presence or absence of the emergency information at an earlier time, and the control delay caused by the notification of the emergency information can be reduced. Therefore, there is provided an advantage of being able to reduce the time required for each mobile terminal to receive the emergency information.

In any of above-mentioned Embodiments 1 to 5, the case in which the shown emergency information flag is one bit of data is described expressly, though the emergency information flag can be any data as long as it has only to show the presence or absence of emergency information. Furthermore, each mobile terminal 1 can be constructed in such a way as to, when there is emergency information, determine that there is emergency information.

In the case in which the emergency information flag is formed as mentioned above, the mobile communications system can notify not only the presence or absence of emergency information, but also information such as the type of the description of the emergency information or the place where the emergency has occurred to each mobile terminal.

As shown in above-mentioned Embodiments 1 to 5, in accordance with the present invention, each base station 2 can notify all the mobile terminals 1 existing within the cell thereof that an emergency has occurred, and can pass the emergency information in a broadcast type multimedia service to enable all the mobile terminals 1 which support the MBMS to automatically connect with the emergency information channel regardless of their states. Therefore, the mobile communications system can notify the emergency information to many unspecified users without imposing any excessive load on the mobile communications network, without adding any special hardware to each mobile terminal 1, and without impairing the immediacy of the emergency information.

In the above-mentioned explanation, the case in which an MBMS which is a broadcast type multimedia service in the 3GPP is used is shown. The present invention is not limited to the case of using an MBMS, and can be applied to any case of using a broadcast type multimedia service for broadcasting a large amount of data by using a mobile communications network.

The above-mentioned examples are based on a W-CDMA method, though the present invention can also be applied to the notification of emergency information using another communications method. For example, the present invention can also be applied to LTE (Long Term Evolution LTE), CDMA2000, and 1xEV-DO described in the Background of the Invention.

INDUSTRIAL APPLICABILITY

As mentioned above, a mobile communications system, a base station, and a mobile terminal in accordance with the present invention are constructed in such a way that in the mobile communications system including a mobile terminal and a base station which relays communications between a network and the mobile terminal, in which the base station can deliver information to the mobile terminal by using a broadcast type multimedia service, the base station sets a flag indicating the presence or absence of emergency information to a control channel used for the broadcast type multimedia service, and notifies the presence or absence of the emergency information to the mobile terminal by using the description of the flag set to the control channel. Therefore, the mobile communications system, the base station, and the mobile terminal in accordance with the present invention are suitable for use as a mobile communications system which notifies emergency information, and a base station and a mobile terminal in the mobile communications system, respectively.

The invention claimed is:

1. A mobile communications system comprising: a plurality of mobile terminals; and
a base station configured to transmit emergency information to the plurality of mobile terminals,
wherein the base station transmits an emergency information indicator showing presence of the emergency information to a plurality of mobile terminals including a mobile terminal in an idle state and a mobile terminal receiving individual data by using first and second paging messages, and wherein the emergency information indicator is at least one bit of a multimedia broadcast multicast service indicator channel,
the base station transmits required information that is required for the plurality of mobile terminals to receive the emergency information, the required information including an emergency information channel number, the emergency information channel number corresponding to a channel through which the plurality of mobile terminals are to receive the emergency information, and
the base station transmits the emergency information to the plurality of mobile terminals according to the required information that is required for the plurality of mobile terminals to receive the emergency information;
wherein the mobile terminal in the idle state receives the emergency information indicator showing presence of the emergency information, transmitted from the base station in the first paging message,
the mobile terminal in the idle state receives the required information that is required for the plurality of mobile terminals to receive the emergency information transmitted from the base station, and
the mobile terminal in the idle state starts receiving the emergency information transmitted from the base station according to the required information that is required for the plurality of mobile terminals to receive the emergency information after receiving the emergency information indicator; and
wherein the mobile terminal receiving individual data receives the emergency information indicator showing presence of the emergency information, transmitted from the base station in the second paging message,
the mobile terminal receiving individual data receives the required information that is required for the plurality of mobile terminals to receive the emergency information transmitted from the base station,
the mobile terminal receiving individual data starts receiving the emergency information transmitted from the base station according to the required information that is required for the plurality of mobile terminals to receive the emergency information after receiving the emergency information indicator, and
a channel through which the emergency information indicator is transmitted is different from a channel through which the required information that is required for the plurality of mobile terminals to receive the emergency information is transmitted, and the emergency information is transmitted through a multimedia broadcast multicast service.

2. The mobile communications system according to claim 1, wherein the mobile communications system is applied to Long Term Evolution.

3. The mobile communications system according to claim 1, wherein the first and second paging messages include a field set the emergency information indicator showing presence of the emergency information.

4. A base station configured to transmit emergency information to a plurality of mobile terminals, comprising:
an indicator transmitting section which transmits an emergency information indicator showing presence of the emergency information to the plurality of mobile terminals;
a required information transmitting section which transmits required information that is required for the plurality of mobile terminals to receive the emergency information, the required information including an emergency information channel number, the emergency information channel number corresponding to a channel through which the plurality of mobile terminals are to receive the emergency information; and
an emergency information transmitting section which transmits the emergency information to the plurality of mobile terminals according to the required information that is required for the plurality of mobile terminals to receive the emergency information,
wherein the indicator transmitting section transmits the emergency information indicator to the mobile terminal in an idle state by using a first paging message, and transmits the emergency information indicator to the mobile terminal receiving individual data by using a second paging message, and
a channel through which the emergency information indicator is transmitted is different from a channel through which the required information that is required for the plurality of mobile terminals to receive the emergency information is transmitted, wherein the channel through which the required information is transmitted is a multimedia broadcast multicast service control channel.

5. A mobile terminal configured to receive emergency information transmitted from a base station, comprising:
an indicator receiving section which receives an emergency information indicator, showing presence of the emergency information, via a multimedia broadcast multicast service indicator channel;
a required information receiving section which receives required information that is required for the mobile terminal to receive the emergency information transmitted from the base station, the required information including an emergency information channel number, the emergency information channel number corresponding to a channel through which the plurality of mobile terminals are to receive the emergency information; and
an emergency information receiving section which starts receiving the emergency information transmitted from the base station according to the required information that is required for the mobile terminal to receive the emergency information after receiving the emergency information indicator,
wherein when the mobile terminal is in an idle state, the indicator receiving section receives the emergency information indicator transmitted from the base station in a first paging message,
when the mobile terminal is receiving individual data, the indicator receiving section receives the emergency information indicator transmitted from the base station in a second paging message, and
a channel through which the emergency information indicator is transmitted is different from a channel through which the required information that is required for the plurality of mobile terminals to receive the emergency information is transmitted, and the emergency information is transmitted through a multimedia broadcast multicast service.

\* \* \* \* \*